(12) United States Patent
Lee et al.

(10) Patent No.: US 7,420,955 B2
(45) Date of Patent: Sep. 2, 2008

(54) WIRELESS COMMUNICATION DEVICE CAPABLE OF SWITCHING ANTENNAS ACCORDING TO DATA TRANSMISSION INFORMATION ON NETWORK

(75) Inventors: Tien-Kuei Lee, Taipei Hsien (TW); Chun-Tsai Chang, Taipei Hsien (TW)

(73) Assignee: Wistron NeWeb Corporation, Hsi-Chih, Taipei Hsien (TW)

( * ) Notice: Subject to any disclaimer, the term of this patent is extended or adjusted under 35 U.S.C. 154(b) by 665 days.

(21) Appl. No.: 10/905,355

(22) Filed: Dec. 29, 2004

(65) Prior Publication Data
US 2006/0002319 A1    Jan. 5, 2006

(30) Foreign Application Priority Data
Jun. 4, 2004    (TW) .............................. 93116159 A

(51) Int. Cl.
*H04B 1/00*    (2006.01)
(52) U.S. Cl. ................. 370/338; 370/334; 455/63.4; 455/63.3; 455/562.1; 343/835; 343/872
(58) Field of Classification Search ........... 370/310.1, 370/311, 334, 338; 455/562.1, 41.2, 63.4, 455/63.3; 343/835, 872
See application file for complete search history.

(56) References Cited

U.S. PATENT DOCUMENTS

| | | | | |
|---|---|---|---|---|
| 7,103,386 | B2* | 9/2006 | Hoffmann et al. | 455/562.1 |
| 7,130,646 | B2* | 10/2006 | Wang | 455/456.5 |
| 7,277,685 | B2* | 10/2007 | Liu et al. | 455/240.1 |
| 2005/0047356 | A1* | 3/2005 | Fujii et al. | 370/311 |
| 2005/0075140 | A1* | 4/2005 | Famolari | 455/562.1 |

* cited by examiner

*Primary Examiner*—George Eng
*Assistant Examiner*—Brandon J Miller
(74) *Attorney, Agent, or Firm*—Winston Hsu

(57) ABSTRACT

A wireless communication device includes a housing, and a wireless communication module installed inside the housing. The wireless communication module includes a plurality of WLAN units, and each WLAN unit includes at least one antenna for receiving and emitting radio signals. The wireless communication module further includes an antenna control unit connected to the plurality of WLAN units for switching the antennas of the plurality of WLAN units, and a processing module installed inside the housing including a computation unit for computing the data transmission information of the plurality of WLAN units and a control unit for controlling the antenna control unit according to the data transmission information computed by the computation unit.

28 Claims, 21 Drawing Sheets

WIRELESS COMMUNICATION DEVICE CAPABLE OF SWITCHING ANTENNAS ACCORDING TO DATA TRANSMISSION INFORMATION ON NETWORK

BACKGROUND OF INVENTION

1. Field of the Invention

The invention relates to a wireless communication device, more specifically, to a wireless communication device capable of switching antennas according to data transmission information on a network.

2. Description of the Prior Art

In modern life, people want access to useful information regardless of time or place. A wireless communication device does not require optical fibers or cable to transmit signals; therefore, it is an attractive way to exchange information. As technology progresses, portable wireless communication devices, such as cell phones and PDAs, have become important information-exchanging tools due to their convenience and portability.

As the wireless communication technology progresses rapidly, access points (AP) are widely used in today's life. Each computer in a wireless local area network (WLAN) requires a WLAN card to transmit electromagnetic signals. The AP are capable of utilizing their antennas to receive electromagnetic signals transmitted by the WLAN station. As well the AP bridges the WLAN to the Ethernet network so that information in the network is integrated and shared. Today, in order to broaden the WLAN communication distance, many AP are positioned in the coverage range of the network or they are arranged flexibly. The corresponding building method is to utilize normal Ethernet switches and CAT-5 cables to build distributed wireless AP arrangements.

Please refer to FIG. 1, which is a diagram of a network topology utilizing an access point 50 in a space. The access point 50 comprises a radiator 52 for receiving or emitting electromagnetic signals, and the coverage range of access point 50 is shown by the dotted lines shown in FIG. 1. When three users have to utilize the access point 50 to bridge the Ethernet network in the coverage range, the users share the data transmission bandwidth of the access point 50. For example, if the maximum bandwidth of the access point 50 is 11 Mbps, each user ideally gets 11/3 Mbps of the wireless data transmission bandwidth.

In the prior art, in order to raise the bandwidth or to broaden the coverage range, more AP 50 are positioned in the space. Please refer to FIG. 2, which is a diagram of a network topology utilizing three access points in a space. If three AP 50 are turned on simultaneously, the bandwidth is ideally 3 times to the bandwidth of using only one access point 50. In other words, if the maximum bandwidth of one access point is 11 Mbps, then three AP 50 ideally provide 11*3=33 Mbps bandwidth. Therefore, if three users utilize three AP 50 to bridge the Ethernet network, then each user is ideally capable of getting 33/3=11 Mbps.

As mentioned above, wireless data transmission bandwidth on the network can be raised by adding the number of AP 50. However a problem arises when a number of the AP 50 are added. If different AP use the same channel or adjacent channels, the main lobe of the transmission channel is overlapped by the side lobe of the adjacent channel such that interference occurs. Therefore, in FIG. 2, if three access points 50 are utilized simultaneously, under the 802.11b standard, the three AP 50 are capable of utilizing channel 1, channel 6, and channel 11 to transfer the wireless information for reduced the interference. Please refer to FIG. 3, which is a distributed diagram of transmission channels in the frequency domain of the 802.11b standard. In the frequency band 2.400 GHz-2.484 GHz, the peak of the main lobe of channel 1 falls on 2.412 GHz, the peak of the main lobe of the channel 6 falls on 2.437 GHz, and the peak of the main lobe of the channel 6 falls on 2.437 GHz. Therefore, between consecutive channels peaks there is about 25 MHz of bandwidth. In the actual implementation, in order to avoid the main lobe overlapping the side lobe, every two channels used have an interval of 5 channels.

As mentioned above, if the number of the AP 50 in a space is too many, interference occurs such that the transmission quality becomes lower. Further, the distance between two AP is limited and can not be too small, otherwise the combined coverage range of the AP is reduced. Thus making it more difficult to reach the users, and causing interference such that transmission dead angle occurs. In additional, each access point needs to be connected to the LAN through network lines, therefore, utilizing a number of AP increases the difficulty of wiring and building.

Furthermore, when utilizing normal AP, the radiation pattern of the prior art antenna cannot change according to different service demands, such as changes of coverage range or directivity. This makes the design of an antenna arrangement relatively inflexible and permanent.

SUMMARY OF INVENTION

It is therefore a primary objective of the claimed invention to provide a wireless communication device capable of switching antennas according to data transmission information on network, to solve the above-mentioned problem.

According to an exemplary embodiment of the claimed invention, a wireless communication device is disclosed comprising: a housing; a wireless communication module installed inside the housing, the wireless communication module comprising: a plurality of wireless local area network (WLAN) units, wherein each WLAN unit comprises at least one antenna comprising at least one radiator for receiving or emitting radio signals; and an antenna control unit electrically connected to the WLAN units for switching the radiators of the WLAN units; and a processing module installed inside the housing, the processing module comprising: a computation unit for computing the data transmission information of the WLAN units; and a control unit for controlling the antenna control unit according to the data transmission information computed by the computation unit.

According to another exemplary embodiment of the claimed invention, a wireless communication device is disclosed comprising: a housing comprising a first shielding surface and a second shielding surface; a wireless communication module installed inside the housing, the wireless communication module comprising: a first antenna installed on the first shielding surface of the housing, the first antenna being capable of emitting a first electromagnetic signal with a first frequency, and the first antenna being capable of switching between a first emitting mode and a second emitting mode wherein a coverage angle of the first emitting mode is wider than a coverage angle of the second emitting mode; a second antenna installed on the second shielding surface of the housing, the second antenna being capable of emitting a second electromagnetic signal with a second frequency, and the second antenna being capable of switching between a third emitting mode and a fourth emitting mode wherein a coverage angle of the third emitting mode is wider a coverage angle of the fourth emitting mode; and an antenna control unit electrically connected to the first antenna and the second antenna for switching the first antenna between the first emitting mode and the second emitting mode and switching the second antenna between the third emitting mode and the fourth emitting mode; and a processing module installed inside the housing comprising: a computation unit for computing the first antenna unit and the data transmission information of the first antenna and the second antenna; and a control unit for controlling the antenna control unit according to the data transmission information computed by the computation unit.

These and other objectives of the claimed invention will no doubt become obvious to those of ordinary skill in the art after reading the following detailed description of the preferred embodiment that is illustrated in the various figures and drawings.

BRIEF DESCRIPTION OF DRAWINGS

FIG. 11 illustrates a radiation pattern when only one radiator is turned on.

FIG. 12 illustrates a radiation pattern when two radiators are both turned on.

FIG. 14 illustrates a radiation pattern when all radiators of an antenna are turned on.

FIG. 15 is a diagram of a radiation pattern when only one radiator of three antennas is turned on.

FIG. 16 is a diagram of a radiation pattern when two radiators of one of the antennas of FIG. 15 are turned on.

DETAILED DESCRIPTION

Figure 1:
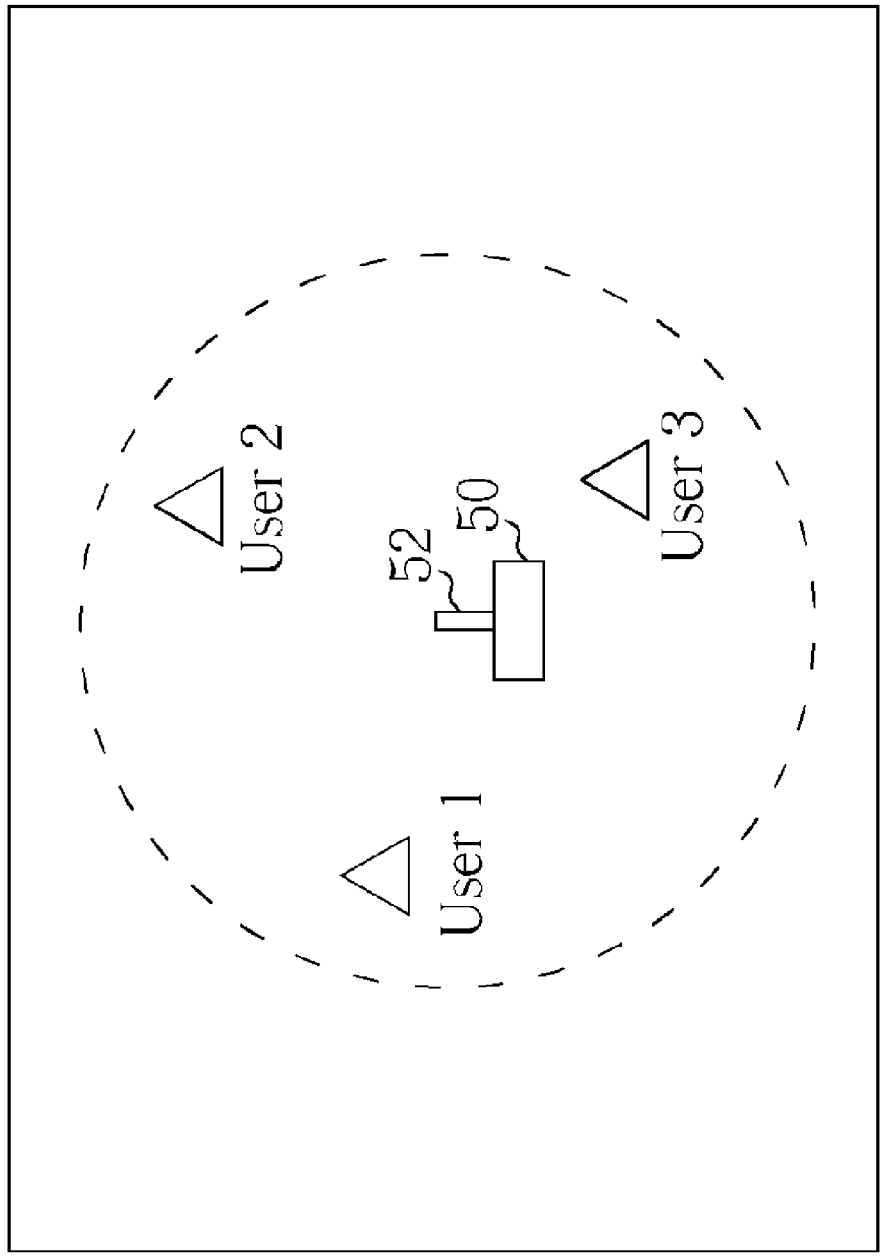
FIG. 1 is a diagram of a network topology utilizing an access point in a space according to the prior art.
Figure 2:
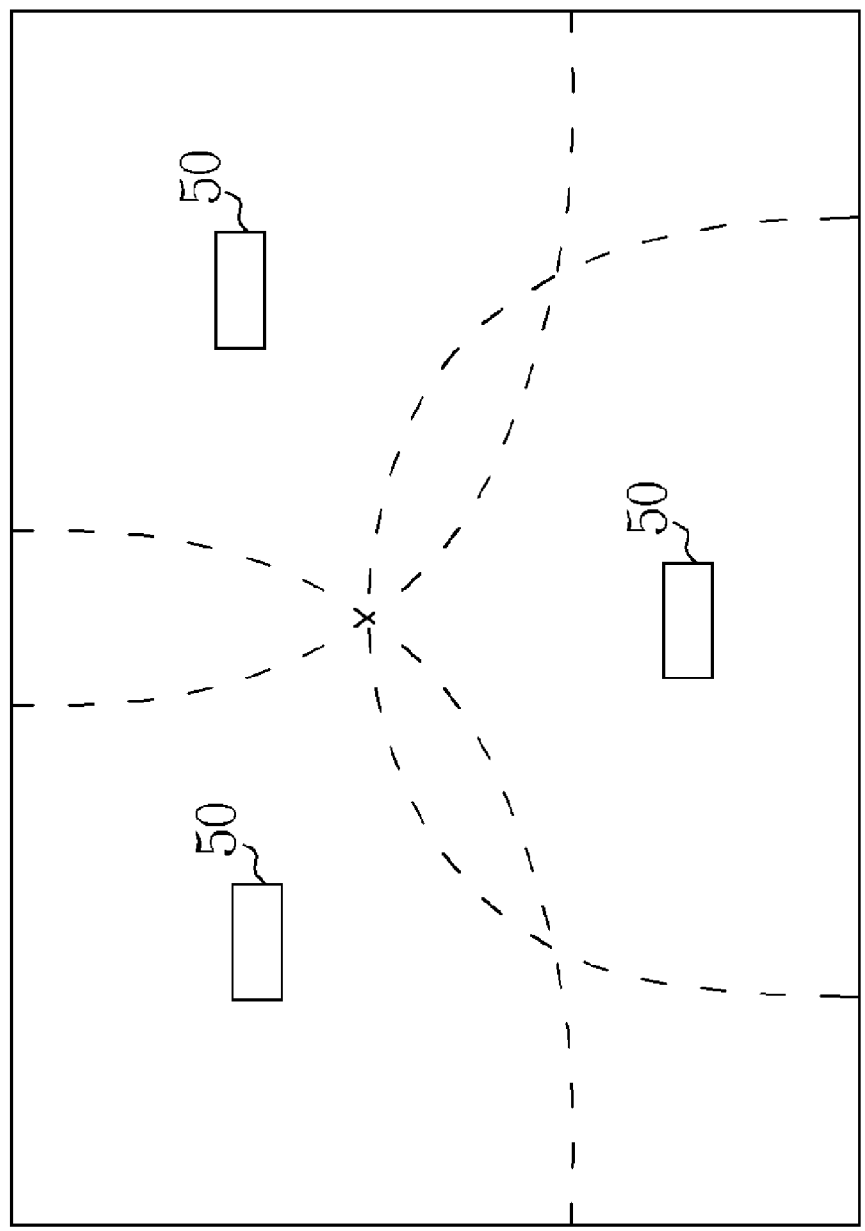
FIG. 2 is a diagram of a network topology utilizing three access points in a space according to the prior art.
Figure 3:
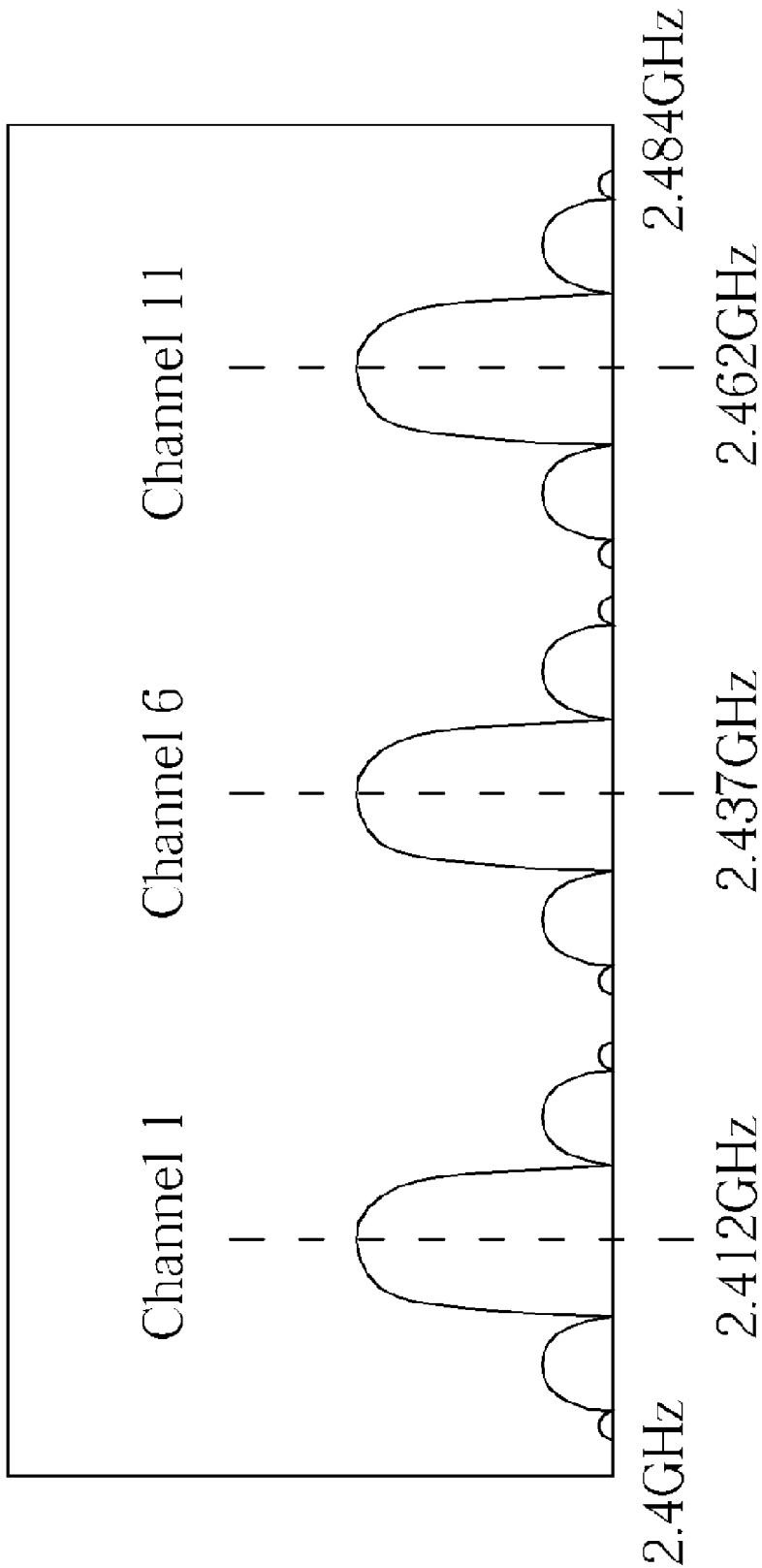
FIG. 3 is a distributed diagram of transmission channels in the frequency domain as specified by the 802.11b standard according to the prior art.
Figure 4:
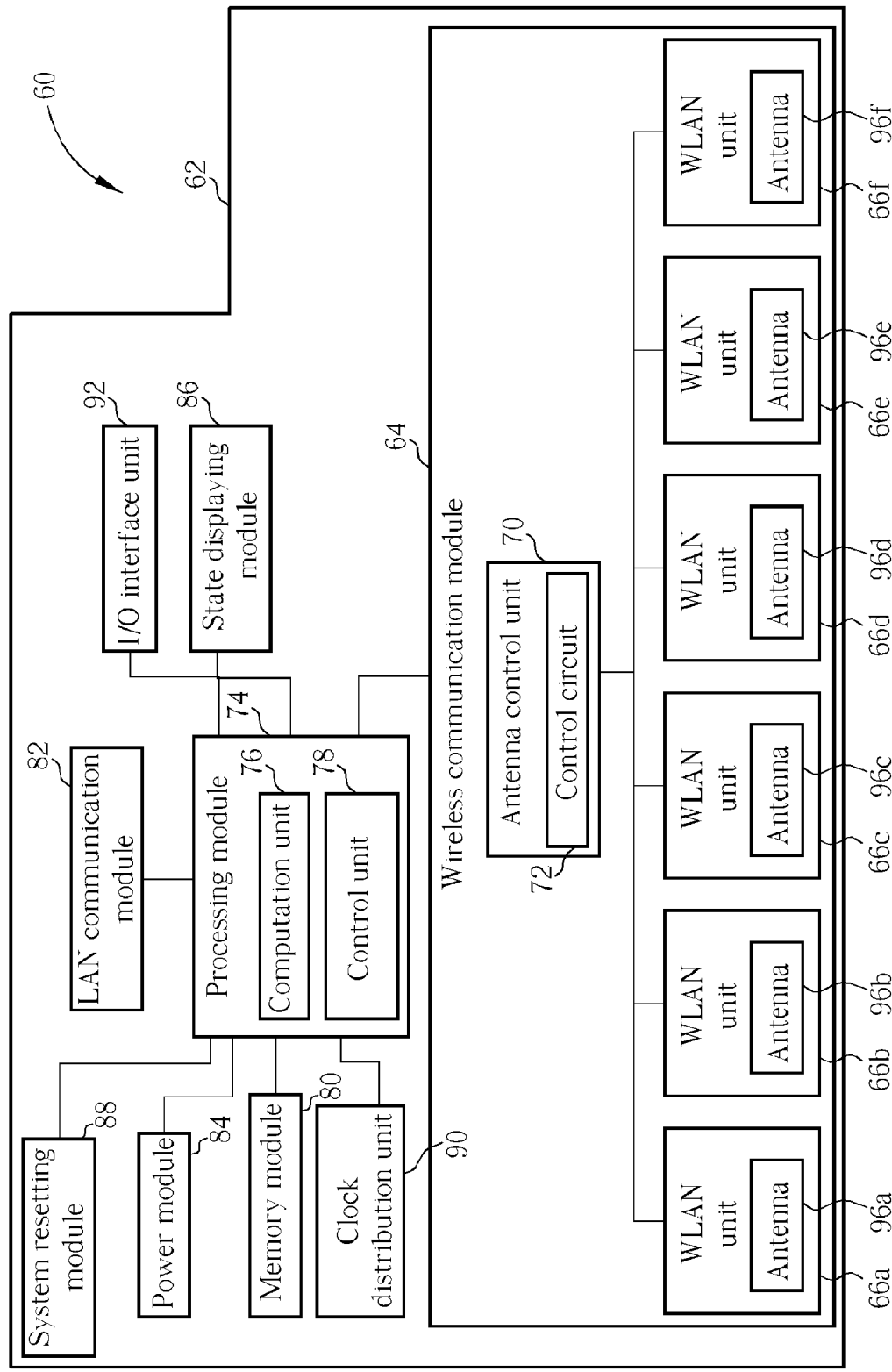
FIG. 4 is a block chart of a wireless communication device according to the present invention.

Please refer to FIG. 4, which is a block chart of a wireless communication device 60 according to the present invention. The wireless communication device 60 comprises a housing 62, and a wireless communication module 64 installed inside the housing that comprises six WLAN units 66a, 66b, 66c, 66d, 66e, and 66f. Each WLAN unit 66 is capable of comprising a WLAN module, which can be utilized under the Atheros standard. The WLAN modules is inserted into slots using mPCI interface. Additionally, each WLAN unit 66 comprises an antenna 96. This means that the WLAN unit 66a comprises the antenna 96a, the WLAN unit 66b comprises the antenna 96b, the WLAN unit 66c comprises the antenna 96c, the WLAN unit 66d comprises the antenna 96d, the WLAN unit 66e comprises the antenna 96e, and the WLAN unit 66f comprises the antenna 96f. The antenna 96 is utilized for receiving or emitting radio signals, which can apply to IEEE 802.11a, IEEE 802.11b, or IEEE 802.11g. Each WLAN module is respectively electrically connected to the corresponding antenna 96, and the power of each WLAN module is independent. This means that each WLAN can be turned on independently of the other WLAN modules. The wireless communication module 64 further comprises an antenna control unit 70, which comprises a control circuit 72 electrically connected to the WLAN unit 66 for controlling the directivity of the antenna 96. In this embodiment, the antenna 96 comprises two radiators. The control circuit 72 is capable of selectively turning on parts of the radiators of the WLAN unit 66. Here, if the control circuit 72 turns on a fewer number of the radiators of the WLAN unit 66, a radiation pattern with weaker directivity is formed. And if the control circuit 72 turns on more number of the radiators of the WLAN unit 66, a radiation pattern with a stronger directivity is formed.

Furthermore, the wireless communication device 60 further comprises a processing module 74, which can be installed inside the housing 62 or separated to the wireless communication module 64. The processing module 74 comprises a computation unit 76 for computing the data transmission information of the WLAN unit 66 and a control unit 78 for controlling the antenna control unit 70 according to the data transmission information computed by the computation unit 76. The wireless communication device further comprises a memory module 80 that can be installed inside the housing 62 or separately to the wireless communication module 64. The memory module 80 can comprise of three memories where one memory is utilized for system works (such as DRAM or DDR RAM), another memory is a flash ROM for storing system programs, the other is a EEPROM for storing parameters set by system. The wireless communication device 60 further comprises a LAN communication module 82, which can comprise a RJ-45 connector, a transformer, a single-port 10/100 Mbps high-speed fast Ethernet transceiver, and an MII interface for connecting the wireless communication device 60 to the LAN. The wireless communication device 60 further comprises a power module 84 which can comprise an AC/DC 12V/2.5V adapter and a switching power chip for transforming the voltage to 1.3V, 2.5V, 3.3V, or the like thereof. The WLAN modules can respectively get 3.3V voltage from the mPCI interface. Therefore, the power module 84 is utilized to provide the power for the wireless communication device 60. The wireless communication device 60 further comprises a state displaying module 86 for displaying the state of the wireless communication device 60 when connecting to the LAN (such as the link/activity state between each WLAN unit 66 and the WLAN communication module 82 and the power supplying state of the power module 84). The wireless communication device further comprises a system resetting module 88 for resetting related functions of the wireless communication device 60, a clock distribution unit 90 for distributing clock to system, and an I/O interface unit 92 which comprises a universal asynchronous receiver/transmitter (UART) interface for providing a detection function to system and an enhanced joint test action group (EJTAG) interface for the designer to develop system.

Figure 5:
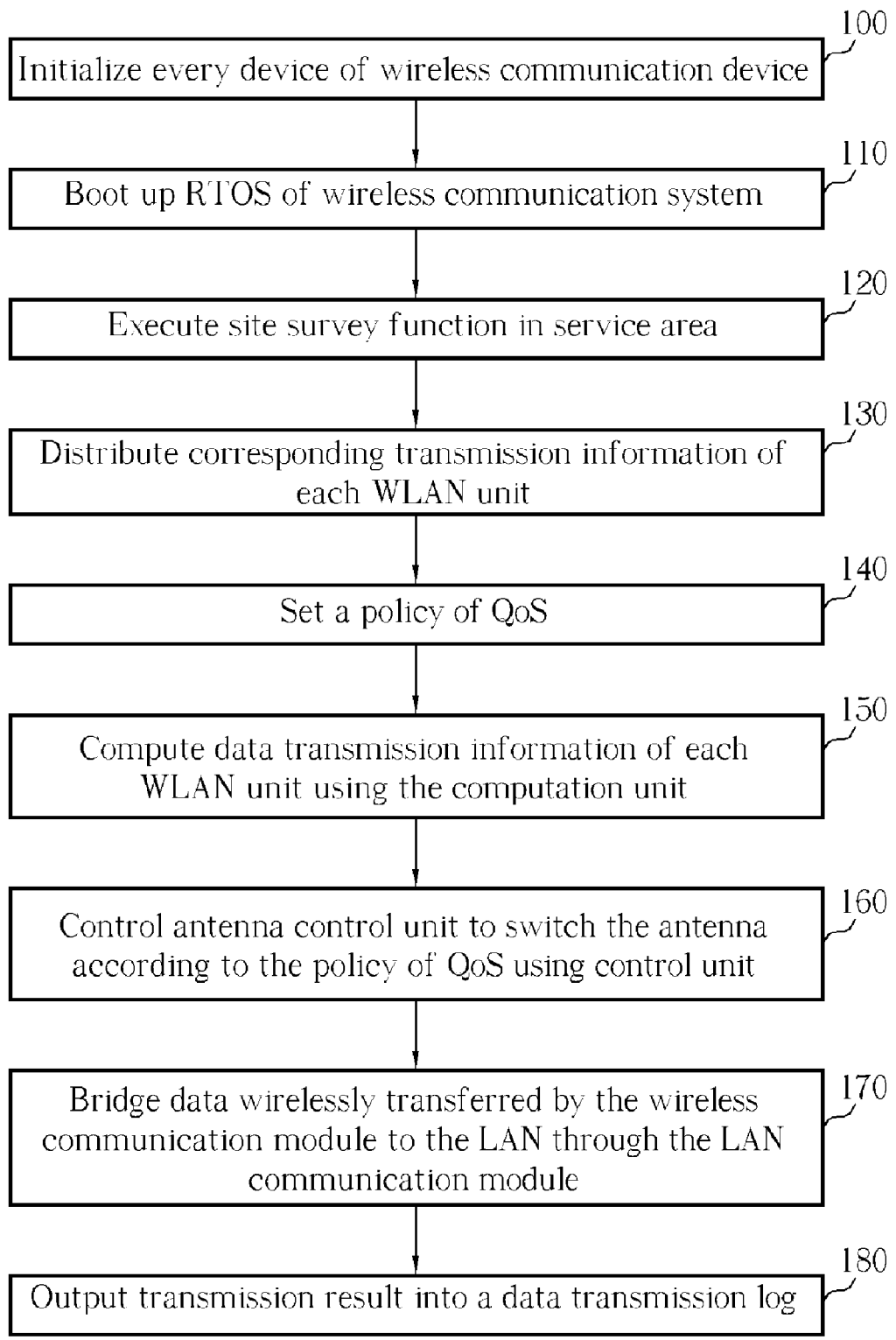
FIG. 5 is a flow chart of the working process of the wireless communication device of FIG. 4.

Please refer to FIG. 5, which is a flow chart of the working process of the wireless communication device 60 according to the present invention. The process comprises following steps:

Step 100: Initialize every device of the wireless communication device 60.

Step 110: Boot up the real time operating system (RTOS) of the wireless communication device 60.

Step 120: Execute the site survey function in the service area.

Step 130: Distribute the corresponding transmission channel to each WLAN unit 66.

Step 140: Set a policy of quality of service (QoS).

Step 150: Compute the data transmission information of each WLAN unit using the computation unit 76.

Step 160: Control the antenna control unit 70 using the control unit 78 to switch the antenna according to the policy of quality of service and the data transmission information of each WLAN unit computed by the computation unit 76.

Step 170: Bridge the data wirelessly transferred by the wireless communication module 64 to the LAN through the LAN communication module 82.

Step 180: Output a transmission result into a data transmission log.

Firstly, when booting up the wireless communication device 60, the devices of the wireless communication device 60 are initialized, such as the processing module 74 and the memory module 80. Then the real time operating system (RTOS) of the wireless communication device 60, such as the Linux kernel program, is booted up for executing the booting procedure. Following this, the wireless communication device 60 executes the site survey function in the service area. After the site survey function is executed completely, the processing module 74 distributes corresponding transmission channel to each WLAN unit 66 to serve the users in the service area. With regard to setting a policy of quality of service, users can set a first transmission parameter through the I/O interface unit 92, which then stores the first transmission parameter in the memory module 80, wherein the first transmission parameter can be a MAC number, a link speed, a radio signal strength index (RSSI), a data flow on network, or a channel utilization. Then the computation unit 76 can compute the data transmission information of each WLAN unit. Therefore, the control unit 78 can control the antenna control unit 70 to switch the antenna according to the first parameter and the data transmission information of each WLAN unit 66 computed by the computation unit.

Figure 6:
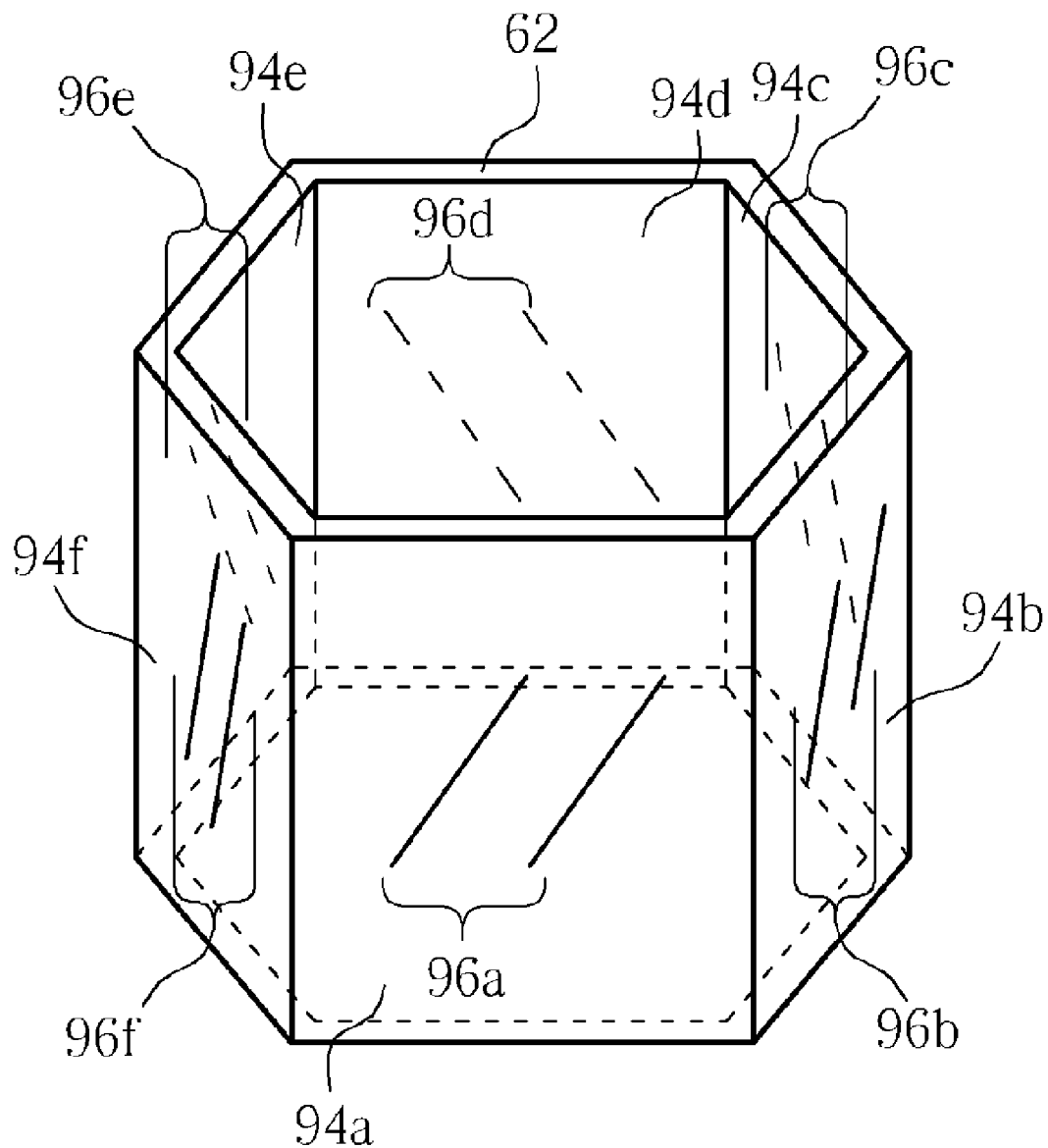
FIG. 6 is a diagram of an antenna of each WLAN unit installed on the housing of a first embodiment according to the present invention.
Figure 7:
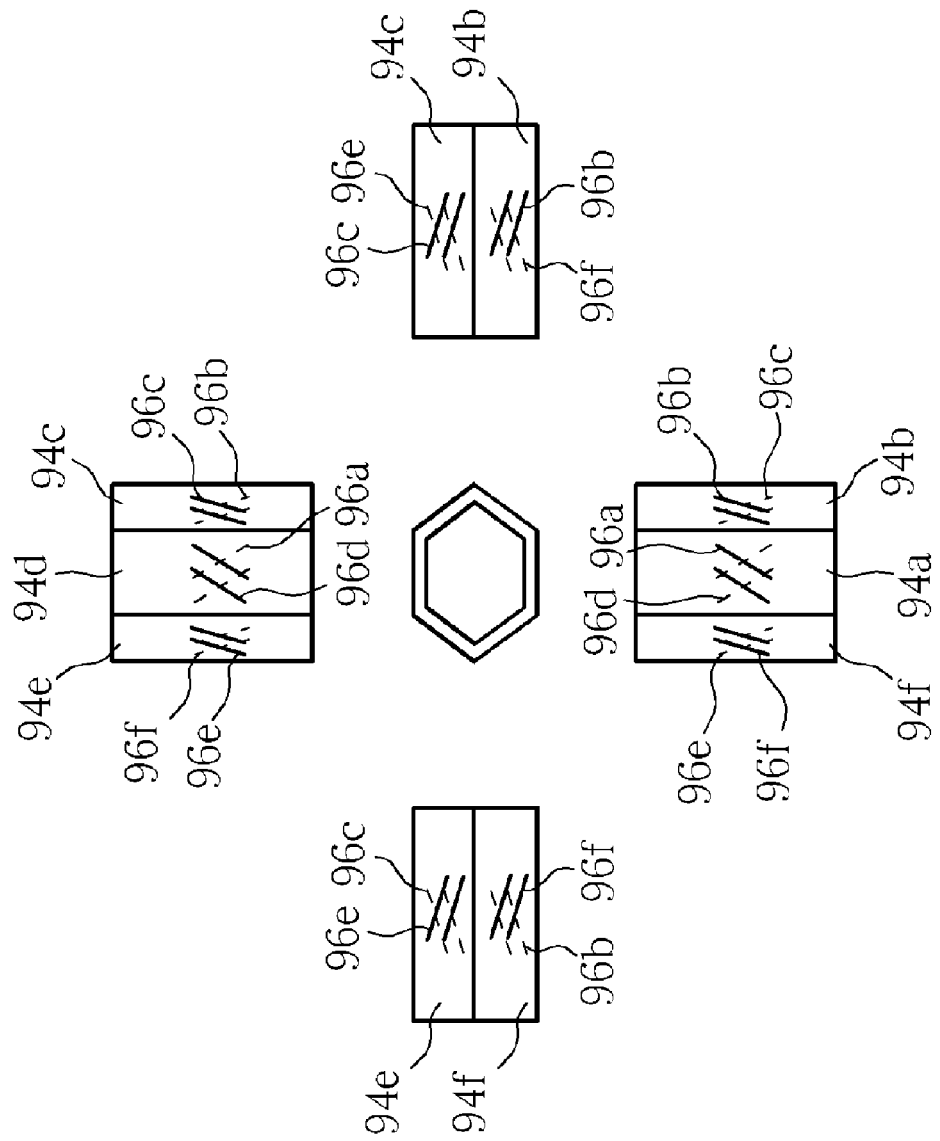
FIG. 7 is a five-view drawing of the antenna installed on the housing of the first embodiment according to the present invention.

Please refer to FIG. 6 and FIG. 7. FIG. 6 is a diagram of an antenna 96 of each WLAN unit 66 installed on the housing 62 of a first embodiment according to the present invention. FIG. 7 is a five-view drawing of the antenna 96 installed on the housing 68 of the first embodiment according to the present invention. The wireless communication device 60 comprises six WLAN units 66a-66f(not shown in FIG. 6 and FIG. 7). As shown in FIG. 6, the housing 62 is a hexagon. The shell 12 includes six metal shielding surfaces 94a-94f formed on the six surfaces of the hexagon for shielding radio signals, and six corresponding antennas 96a-96f of six WLAN units 66a-66f formed respectively on the six shielding surfaces 94a-94f, arranged in the same direction, and having an angle of 45 degrees with the bases of the six shielding surfaces 94a-94f, respectively. The devices of wireless communication device 60 (not shown in either FIG. 6 or FIG. 7) are installed inside the housing 62, and the wireless communication module 64 can switch the six antennas 96a-96f through the control circuit 72 of the antenna control unit 70.

Figure 8:
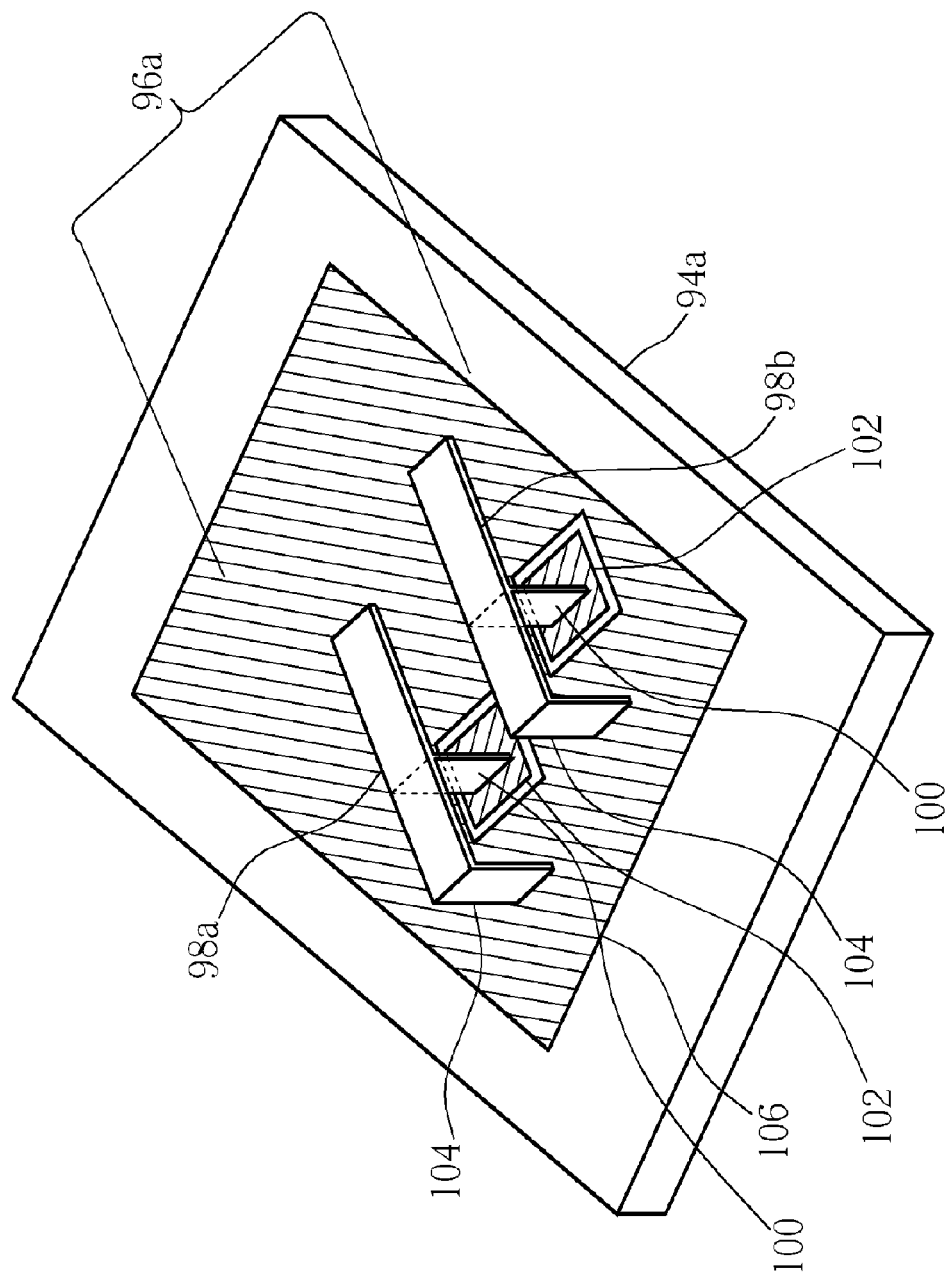
FIG. 8 is a diagram of the connection between the antenna unit and the shielding surface.

Please refer to FIG. 8, which is a diagram of the connection between the antenna unit 96a and the shielding surface 94a. The antenna 96a can be a planar inverted F antenna (PIFA) or another antenna that is connected to the shielding surface 94a. The antenna 96a including two radiators 98a, 98b arranged in a matrix for receiving and emitting RF signals, and the two radiators 98a, 98b are arranged in parallel for receiving and emitting RF signals. Two feeding ends 100 stretching out from the radiators 98a, 98b are connected perpendicularly to two signal transmitting ends 102 of the shielding surface 94a for transmitting RF signals, and two ground ends 104 stretching out from the radiators 98a, 98b are connected perpendicularly to a ground plane 106 of the shielding surface 94a. The antenna 96a transmits and receives RF signals by using the resonance of the radiators 98a, 98b where the length of the radiators 98a, 98b can impact the frequency range of transmitting and receiving RF signals, and the transmission of RF signals between the antenna 96a and the WLAN unit 66a relies on the connection between the feeding end 100 of the antenna 96a and the signal transmitting end 102 of the shielding surfaces 94a. The antenna 96a is not limited to the inclusion of two radiators 98a, 98b. A single emitter or another number of emitters is also possible. The connection between the other five antenna units 96b-96f and the other five shielding surfaces 94b-94f respectively, is the same as shown in FIG. 8. The antenna 96 can be connected to the shielding surface 94 in other manners and is not limited to the aforementioned description.

Figure 9:
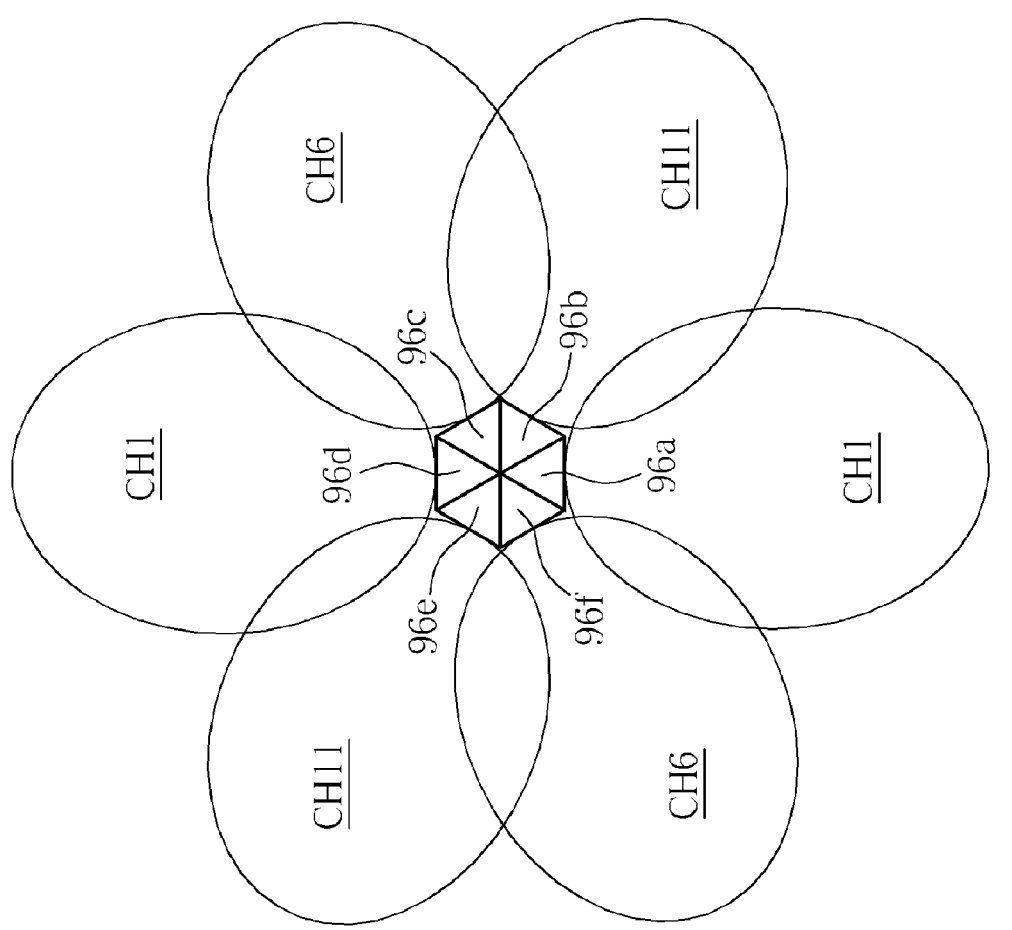
FIG. 9 is a diagram illustrating how the antenna of the wireless communication device share the channels

According to the present invention, the radiators on two parallel shielding surfaces are perpendicular to each other. That is, the antenna 96a on the shielding surface 94a is perpendicular to the antenna unit 96d on the shielding surface 94d, the antenna 96b on the shielding surface 94b is perpendicular to the antenna 96e on the shielding surface 94e, and the antenna 96c on the shielding surface 94c is perpendicular to the antenna 96f on the shielding surface 94f. In such a manner, the polarity directions of the antenna units on two parallel shielding surfaces are perpendicular to each other so that the signal isolation between the two antenna units is increased. For instance, if the wireless communication device 60 is for providing IEEE 802.11b or IEEE 802.11g LAN service, since three channels, such as CH1, CH6 and CH11 can be used within a band of 2.4 GHz (2.4-2.4835 GHz), the interference caused by the main lobe overlap can be reduced. Please refer to FIG. 9 showing the antenna of the wireless communication device 60 sharing the channels. As shown in FIG. 8, signal channels used by the antenna units on two parallel shielding surfaces are the same. That is, the antennas 96a and 96d use CH1, the antennas 96b and 96e use CH11, and the antennas 96c and 96f use CH6. In such a manner, the antennas on two neighboring shielding surfaces do not use the same channel or even two channels close in frequency to prevent the interference between each other. And although the antennas on two parallel surfaces use the same channel, since the direction of emission is opposite to each other and there is a metal shield between the two antennas, interference does not occur. In addition to this, indirect interference caused by environmental radio reflection should be considered. Since the antennas on two parallel shielding surfaces are perpendicular to each other, the radio polarities of the antennas are accordingly perpendicular to each other. Therefore, even if the same channel is used, radio waves caused by reflection or scattering, will be received by an antenna unit on the opposite shielding surface and the interference will be reduced to a minimum. Moreover, the wireless communication device 60 uses six WLAN units 66 for wireless data transmission, so that the transmission speed is ideally six times that of a single AP. In other words, if the maximum transmission speed of an AP is 11 Mbps, the wireless communication device 60 of the first embodiment according to the present invention provides a maximum transmission speed of 11*6=66 Mbps.

Figure 10:
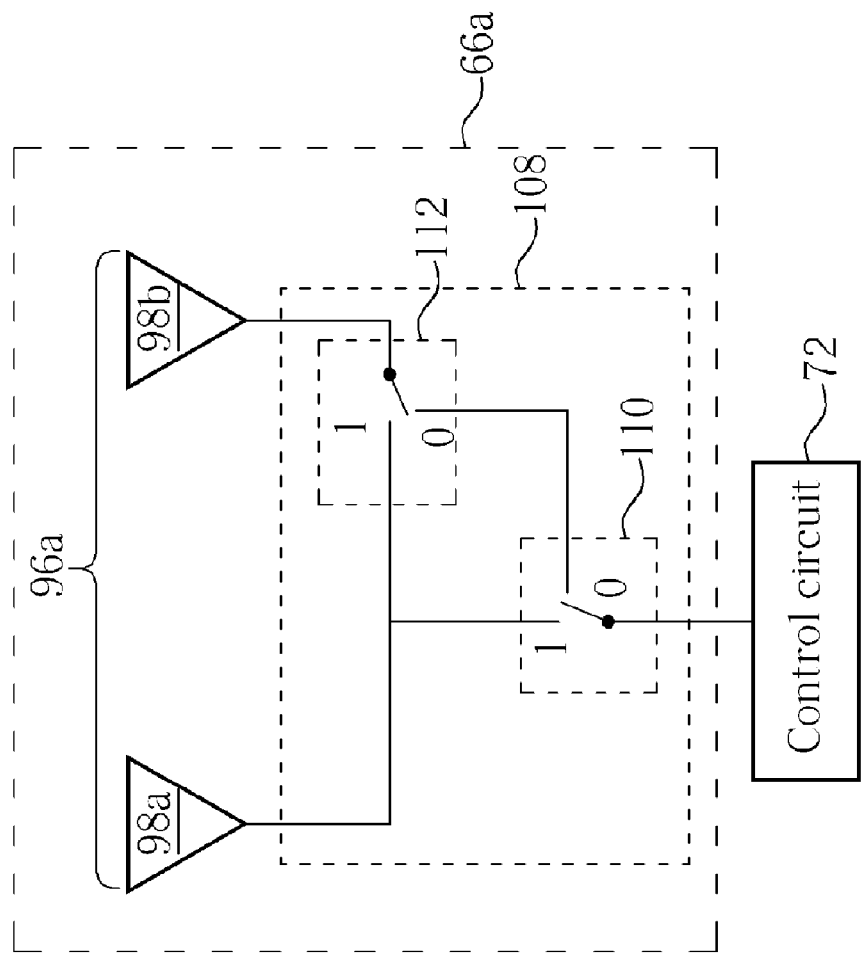
FIG. 10 is a diagram of the connection between the antenna and the control circuit.

Please refer to FIG. 10, which is a diagram of connection between the antenna 96a and the control circuit 72. The WLAN unit 66a further comprises a control switch module 108 electrically connected to two radiators 98a, 98b and the control circuit 72 for controlling the electrical connection between two radiators 98a, 98b and the control circuit 72. As shown in FIG. 10, the control switch module 108 comprises a first control switch 110 and a second control switch 112 which are single-pole double-throw switches. This means the two control switches 110, 112 can receive two signals and utilize the characteristic of the single-pole double-throw switches to switch into two different positions. For example, if the control circuit 72 receives a control signal from the control unit 78 of the processing module 74 to turn on one of the two radiators 98a or 98b, a signal with signal value 0 is transmitted to the control switch module 108 so that the first control switch 110 and the second control switch 112 are switched into the position 0. Therefore, the connection between the control circuit and the radiator 98b is established, but the connection between the control circuit and the radiator 98a is broken. This means that only the radiator 98b can transmit RF signals. Additionally, if the radiator 98a, 98b are both needed to be turned on, a signal with a signal value 1 is transmitted to the control switch module 108 so that the first control switch 110 and the second control switch 112 are switched into the position 1. It can be easily seen that the connections between radiator 98a and the control circuit 72 and radiator 98b and the control circuit 72 are both established so that the radiator 98a, 98b can transmit RF signals. Additionally, it can also be designed such that the first control switch and the second control switch are switched into position 0 if a signal with a signal value 1 is transmitted to the control switch module 108 so that the radiator 98b is turned on. The method of selectively turning on the radiators of the present invention control switch module 108 is not limited to utilizing single-pole double-throw switches but any other forms of switches. For example, a plurality of switches can be used and each switch corresponds to each radiator for establishing the connection between the radiator and the control circuit 72 and further control the antennas.

Figure 11:
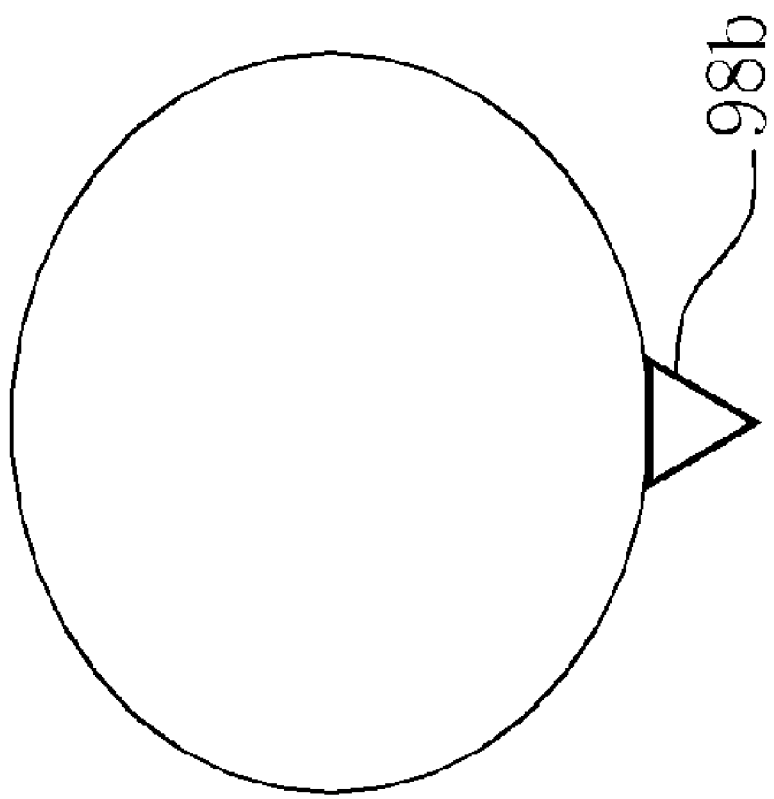
Figure 12:
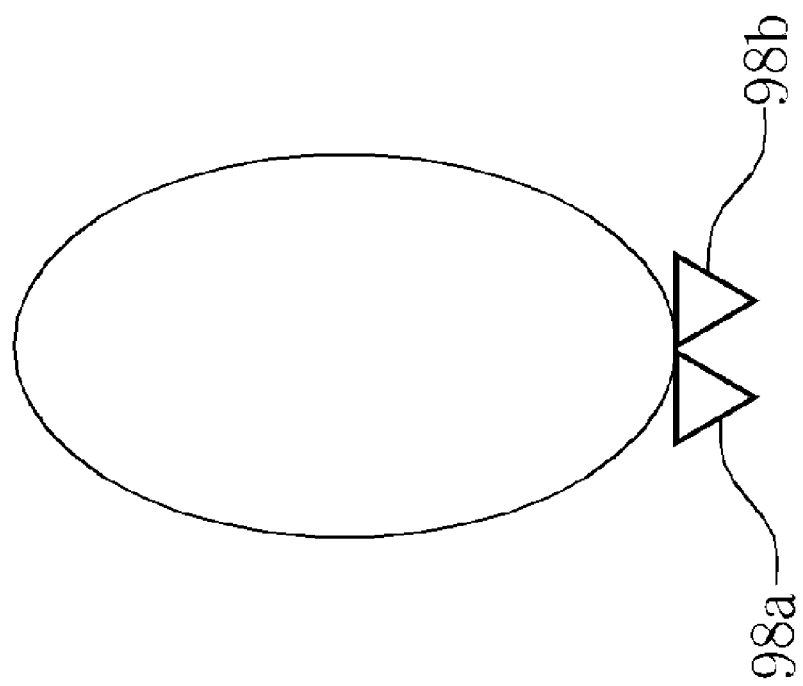

Please refer to FIG. 11 and FIG. 12, which illustrate the radiation pattern of the antenna 96a in different conditions. While in operation, the electromagnetic wave is transmitted to the front side of the antenna 96a, because of a metal shielding surface positioned on back of the antenna 96a (not shown in FIG. 11 and FIG. 12). FIG. 11 illustrates a radiation pattern when only radiator 98b is turned on, and FIG. 12 illustrates a radiation pattern when two radiators 98a, 98b are both turned on. From FIG. 11 and FIG. 12 it is understood that when the control switch module 108 only turns on the radiator 98b, the antenna 96a forms a radiation pattern with a weaker directivity but a wider coverage area, and when the control switch module 108 turns on the radiators 98a, 98b, the antenna 96a forms a radiation pattern with a stronger directivity but a more narrow coverage area. In general when the control circuit 72 turns on a fewer number of radiators, the antenna 96a forms a radiation pattern with a weaker directivity, but when the control circuit 72 turns on a greater number of radiators, the antenna 96a forms a radiation pattern with a stronger directivity.

Figure 13:
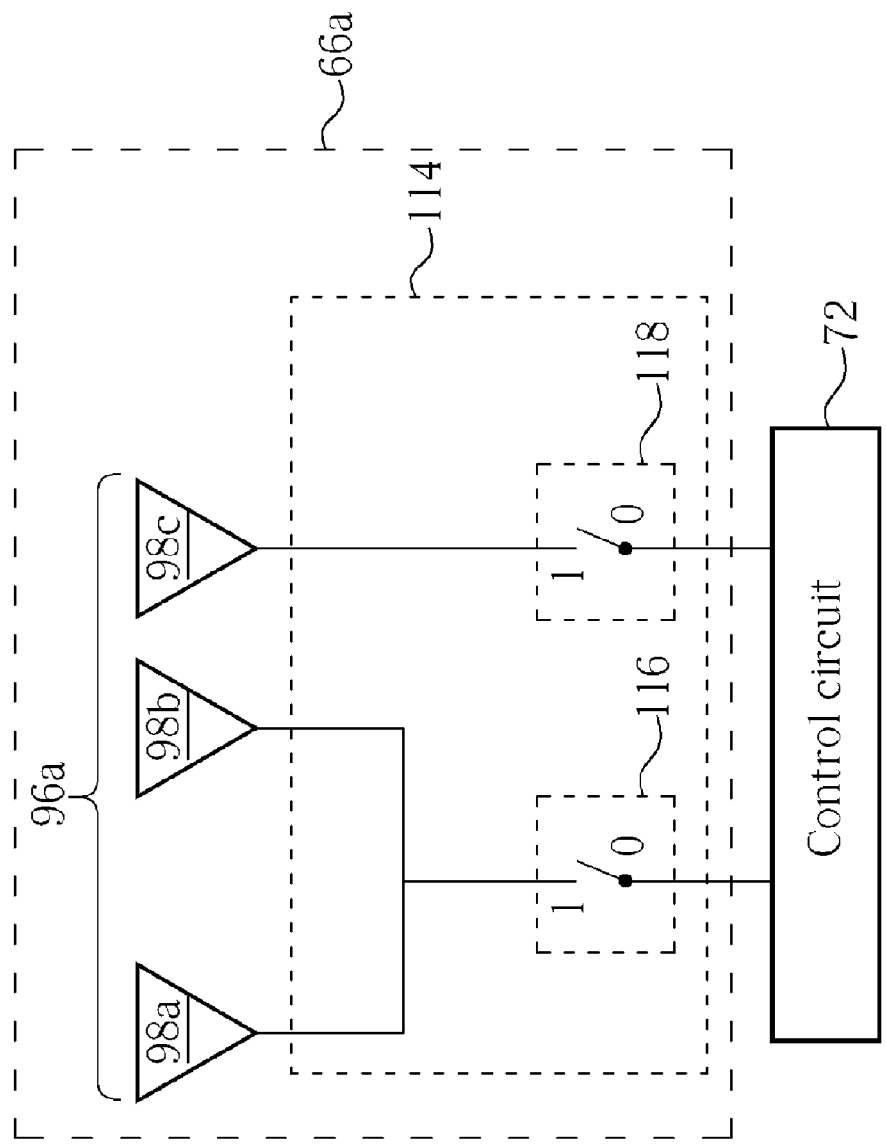
FIG. 13 is a diagram of the connection between the antenna and the control circuit of the second embodiment according to the present invention.

The number of the radiators of the antenna is not limited to 2. Other numbers are also available, as long as the control switch module is designed well such that the control switch module is able to selectively turn on subsets of radiators of the antenna. Please refer to FIG. 13, which is a diagram of connection between the antenna 96a and the control circuit 72 of the second embodiment according to the present invention. The antenna 96a includes three radiators 98a, 98b, 98c, which can be all forms of antennas and are arranged in an array. The WLAN unit 66a further comprises a control switch module 114 electrically connected to three radiators 98a, 98b, 98c and a control circuit 72 for controlling the control switch module 28 to selectively turn on parts of radiators 98a, 98b, 98c. The control switch module 114 includes a third control switch 116 and a fourth control switch 118, wherein the operational methods of the control switch 116 and the control switch 118 are the same as the operational methods of the first and the second switch of the first embodiment. Similarly, if the control circuit 72 has to turn on one of the three radiators 98a, 98b, 98c, a signal with signal value 0 is transmitted to the control switch 116 and another signal with signal value 1 is transmitted to the control switch 118 so that only the connection between the radiator 98c and control circuit 72 is established. Hence, only radiator 98c is turned on and allowed to transmit signal.

On the other hand, if the control circuit 24 is required to turn on two of the three radiators 98a, 98b, 98c, a signal with signal value 1 is transmitted to the control switch 116 and another signal with signal value 0 is transmitted to the fourth control switch 118 so that only the connections between the control circuit 72 and the radiators 98a, 98b are established. As a result, two radiators 98a, 98b are turned on and allowed to transmit signals. Additionally, if the control circuit 72 is required to turn on all the three radiators 98a, 98b, 98c, a signal with signal value 1 is transmitted to both the control switch 116 and the control switch 118. Doing this establishes the connections between the control circuit 72 and the three radiators 98a, 98b, 98c such that all three radiators 98a, 98b, 98c are turned and allowed to transmit signals.

Finally, if the control circuit 72 is required to turn off all radiators 98a, 98b, 98c, a signal with signal value 0 is transmitted to the control switch 116 and the control switch 118, thus breaking the connections between the control circuit 72 and the three radiators 98a, 98b, 98c. This means three radiators 98a, 98b, 98c are all turned off.

Figure 14:
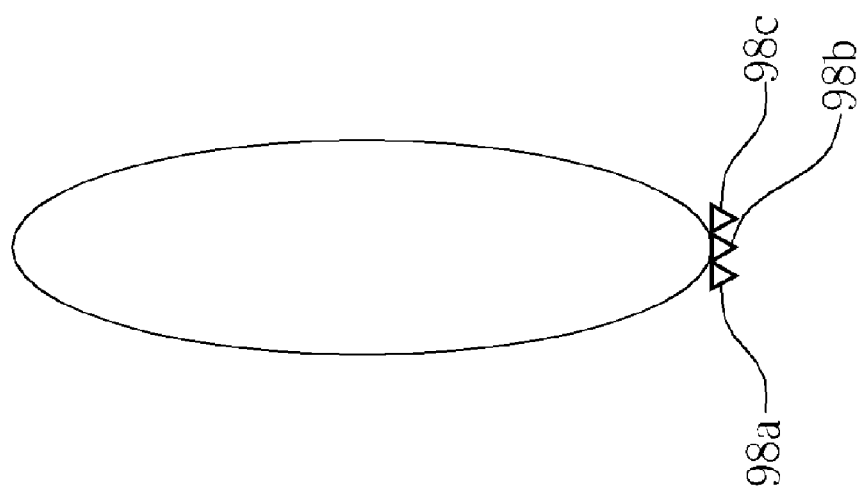

Similar to the first embodiment, when the control circuit 72 turns on a fewer number of radiators, a radiation pattern with weaker directivity is formed, but when the control circuit turns on a greater number of radiators, a radiation pattern with stronger directivity is formed. When the radiator 98c is only utilized to transmit signals, the radiation pattern is similar to that shown in FIG. 11. When two radiators 98a, 98b are utilized to transmit signals, the radiation pattern is similar to that shown in FIG. 12. Please refer to FIG. 14, which illustrates a radiation pattern when radiators 98a, 98b, 98c are all turned on. By comparing FIG. 11, FIG. 12, and FIG. 14, it is seen that when radiators 98a, 98b, 98c are all turned on, the antenna 96 forms a radiation pattern having stronger directivity and a more narrow coverage area than when only one or two antenna units are turned on.

The number of radiators (such as 2 or 3) of the antenna is only used for an illustration, and is not a limitation of the present invention. In fact, the number of radiators can be changed according to design requirements. In general, when fewer radiators are turned on, the antenna forms a radiation pattern with a weaker directivity and larger coverage range, but when more radiators are turned on, the antenna forms a radiation pattern with a stronger directivity and smaller coverage range.

Now steps 140, 150, and 160 as shown in FIG. 5 will be described. When the first parameter of the memory module 80 is the MAC number, the computation unit 76 of the processing module 74 can compute the MAC number of WLAN units 66. For example, if the computation unit 76 computes the MAC number of the WLAN unit 66d that is less than the first parameter, the control unit 78 of the processing module 74 instructs the control circuit 72 of the antenna control unit 70 to turn on a fewer number of radiators of the WLAN unit 66d, so that a radiation pattern with weaker directivity is formed (as shown in FIG. 11). In this case, the antenna 96d is regarded to be in a first emitting mode. This is because the load of the users in the service area of the antenna 96d is lower. In the first emitting mode the antenna 96d can help neighboring antennas by sharing some of their load; therefore, only one or a fewer than maximum number of radiators of antenna 96d need to be turned on to form a radiation pattern with a wider coverage area, albeit with weaker directivity. This means the coverage area of antenna 96d can cover the service areas of antennas 96c, 96e to share their loads.

On the other hand, when the computation unit 76 computes that the MAC number of the WLAN unit 66d that is larger than the first parameter, the control unit 78 of processing module 74 controls the control circuit 72 of the antenna control unit 70 to turn on a greater number of radiators of WLAN unit 66d so that a radiation pattern with stronger directivity is formed (as shown in FIG. 12). The antenna 96d, in this case, is regarded to be operating in a second emitting mode. This is because the load of the users in the service area of the antenna 96d is larger. As a result the antenna 96d only has to cover its service area.

Figure 15:
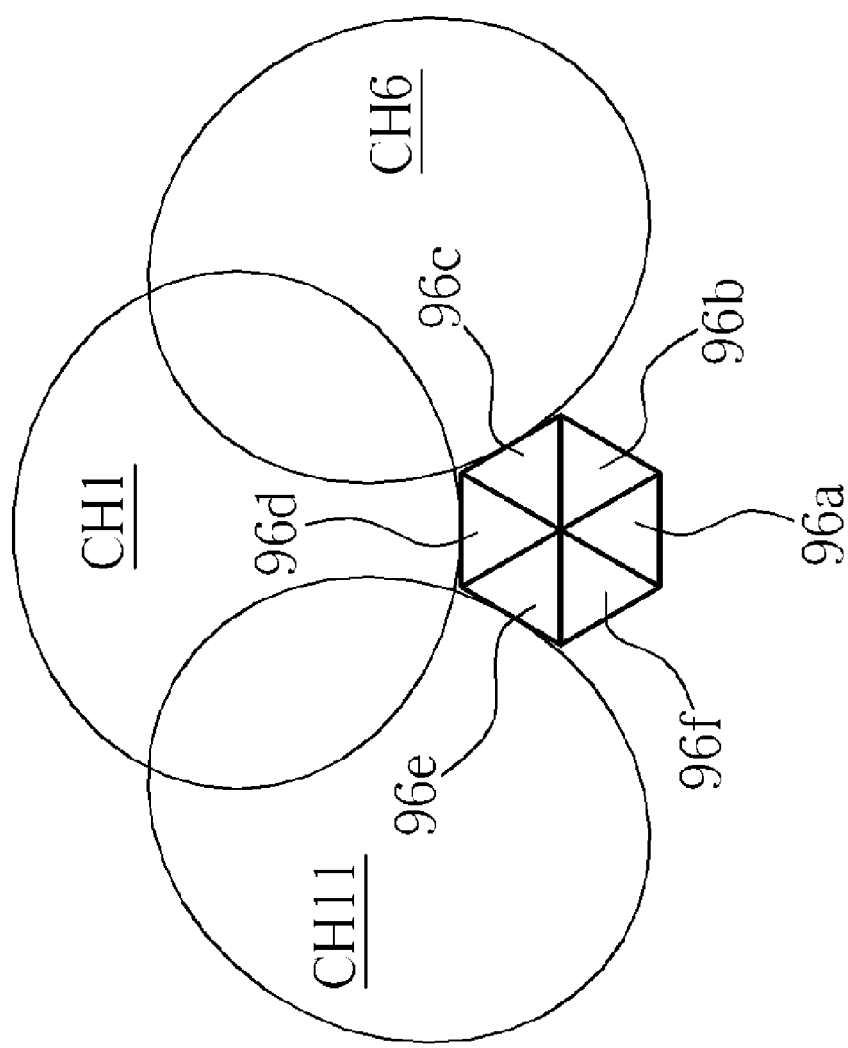
Figure 16:
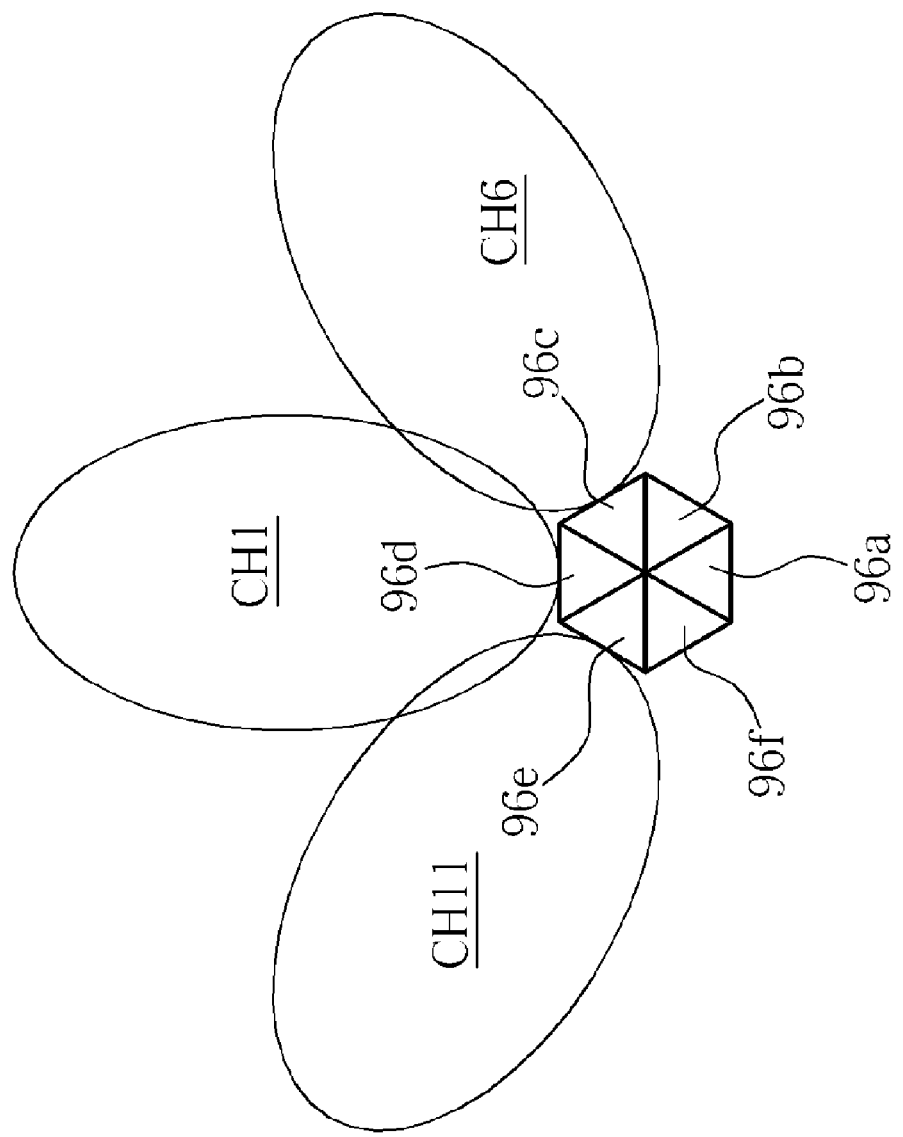

To clarify this concept, please refer to FIG. 15 and FIG. 16. FIG. 15 is a diagram of the radiation pattern when only one radiator of antenna 96d is turned on. FIG. 16 is a diagram of the radiation pattern when two radiators of antenna 96d are turned on. In FIG. 15, the antenna 96d is in the first emitting mode whose directivity is weaker. In FIG. 16, the antenna 96d is in the second emitting mode whose directivity is stronger.

Figure 17:
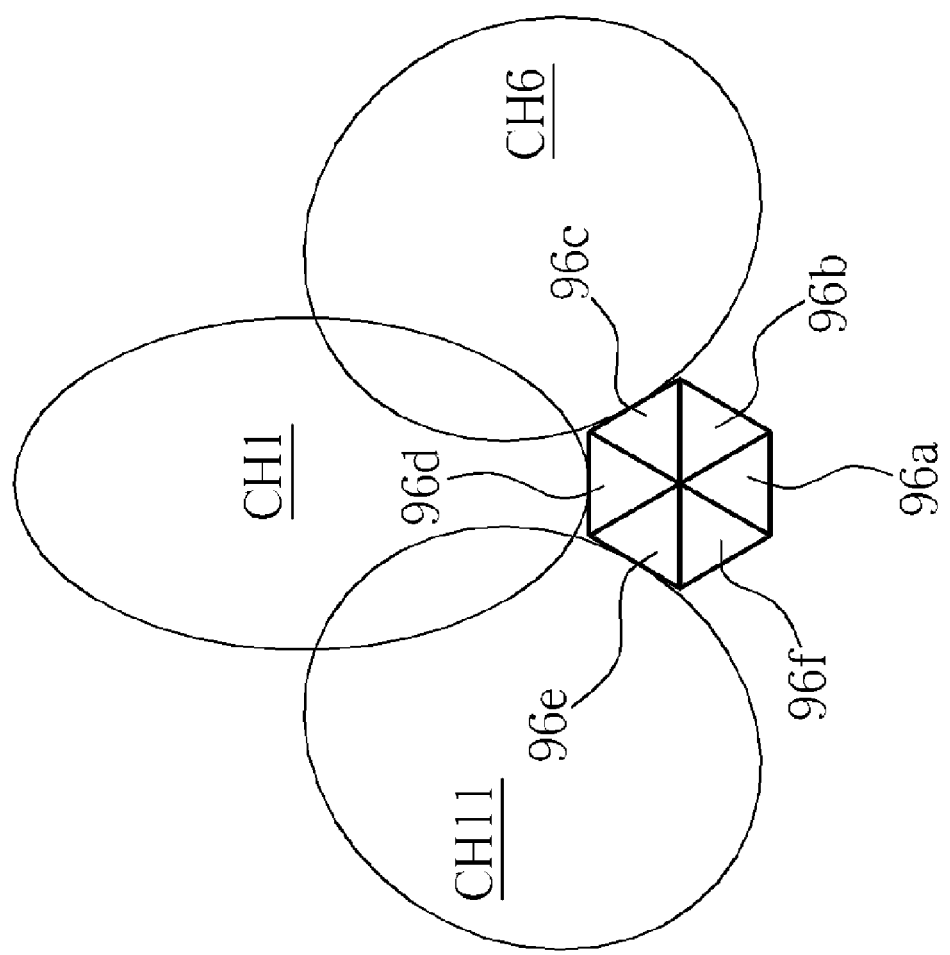
FIG. 17 is a diagram of a radiation pattern when one the antennas of FIG. 15 is in the second emitting mode and two of the antennas are in the first emitting mode.

When the computation unit 76 computes the MAC number of the WLAN unit 66d that is larger than the first parameter, the wireless communication device 60 can move part of the load of the users of the antenna 96d to the antennas 96b or 96f. The above-mentioned implementation is in place to stop the WLAN unit from generating beacons through antenna 96d when the user load is saturated in the WLAN unit 66d service area, so that other users cannot join the said service area. If this occurs, the radiation pattern of the antennas 96c, 96e can be changed such that users can receive beacons from WLAN units 66c and 66e. Therefore, the other users can join the service areas of WLAN 66c and 66e through antennas 96c and 96e, respectively. Please refer to FIG. 17, which is a diagram of the radiation pattern when the antenna 96d is in the second emitting mode and the antennas 96c, 96e are in the first emitting mode. When the load of user service area of antenna 96d is larger, two radiators of antenna 96d can be turned on to provide a radiation pattern with a stronger directivity. Thereby, matching the coverage area to the corresponding service area. At the same time, if the computation unit 76 computes that either the MAC number of WLAN units 66c or 66e is less than the first parameter (it also means that loads of antennas 96c and 96e are both less than load of antenna 96d), antennas 96c and 96e can help share the load of the neighboring antenna 96d. To accomplish this, antennas 96c, 96e need only to have one radiator each turned on, thus providing radiation patterns with weaker directivity but a wider coverage area. Therefore, the coverage area can cover the service area of the antenna 96d and load of antenna 96d is shared with antennas 96c and 96e. In summary, once saturated the WLAN unit 66d does not generate beacons through antenna 96d, but the WLAN units 66c, 66e continue to generates beacons through antennas 96c, 96e. Users in both the respective coverage areas of antennas 96c, 96e and the shared service area of WLAN unit 66d may receive beacons from the WLAN units 66c and 66e and hence utilize WLAN units 66c and 66e.

Figure 18:
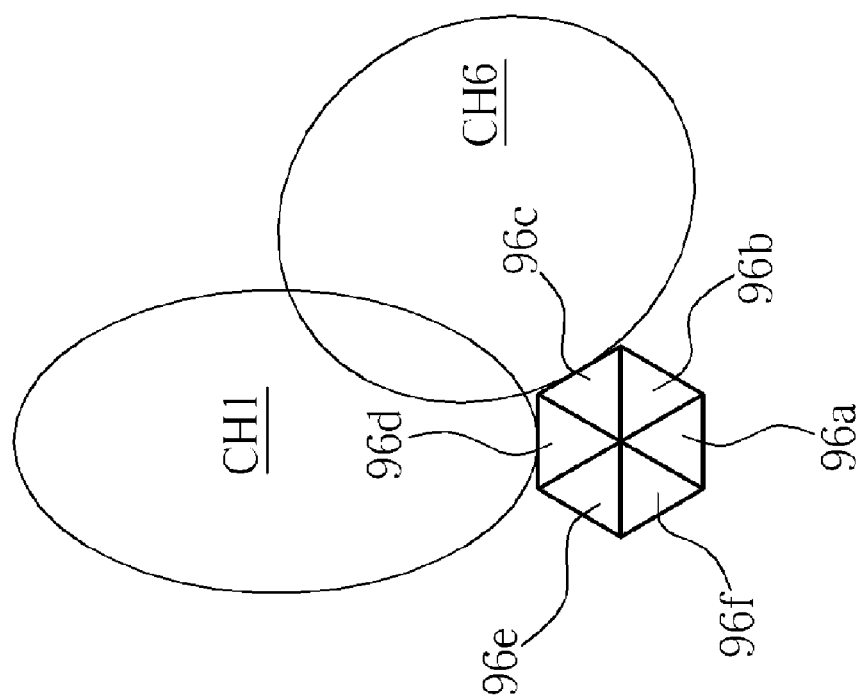
FIG. 18 is a diagram of a radiation pattern when an antenna is in the first emitting mode and another antenna is in the second emitting mode.

Furthermore, in step 140, a policy of quality of service (QoS) is set through comparing the data transmission information of the WLAN unit 66 with the first parameter stored in the memory module 80. But in fact, it can also be set through comparing data transmission information of two neighboring antennas. The results can be compared in accordance of the control unit 78 to control the antenna control unit 70. For example, if the computation unit 76 of the processing module 74 computes a first MAC number of the WLAN unit 66d through antenna 96d which is greater than a second MAC number of the WLAN unit 66c through antenna 96c, then the control unit 78 can control the control circuit 72 antenna of the antenna control unit 70 to switch the antenna 96d into the second emitting mode and switch the antenna 96c into the first emitting mode. Please refer to FIG. 18, which is a diagram of a radiation pattern when antenna 96c is in the first emitting mode and antenna 96d is in the second emitting mode. As shown in FIG. 18, when the load of the service area of antenna 96d is larger (the MAC number of WLAN unit 66d is larger), two radiators of antenna 96d can be turned on to generate a radiation pattern with stronger directivity. So, the coverage area only covers corresponding service area. When the load of the service area of antenna 96c is lower than those of antenna 96d, antenna 96c can help neighboring antenna 96d share the load. This is accomplished by turning on only one radiator of antenna 96c to providing a radiation pattern with wider coverage area (instead of stronger directivity), so that the coverage area encompasses the service area of antenna 96d and the loads of WLAN unit 66d are shared. For example, some users of antenna 96d change to utilize antenna 96c.

In the above-mentioned embodiment, the emitting mode of the antenna 96d can be different from the emitting mode of the antenna 96c. In other words, the antenna 96d can be in a first emitting mode having weaker directivity or a second emitting mode having stronger directivity, and the antenna 96c can be in a third emitting mode having weaker directivity or a fourth emitting mode having stronger directivity wherein the first emitting mode can be the same as the third emitting mode (as the above-mentioned embodiment) or different from the third emitting mode, and the second emitting mode can also be the same as the fourth emitting mode (as the above-mentioned embodiment) or different from the fourth emitting mode. The operation when the first emitting mode is different from the third emitting mode and the second emitting mode is different from the fourth emitting mode is similar to the operation of the above-mentioned embodiment and thus omitted here.

The above-mentioned first parameter and the data transmission information of the WLAN unit 66 computed by the computation unit 76 is not only limited to the MAC number, but can be things such as link speed, radio signal strength index, data flow on network, or channel utilization. Regardless of which parameter is utilized, the operation is similar to that of utilizing the MAC number. For example, when computation unit 76 computes the link speed of the WLAN unit 66, and it is larger than the first parameter, the control circuit 72 reduces the numbers of active radiators of the WLAN unit 66 to form a radiation pattern with weaker directivity to share the load of neighboring antennas. When the link speed is smaller than the first parameter, the control circuit 72 turns on more number of radiators of the WLAN units to form a radiation pattern with stronger directivity. In fact, as mentioned above, a comparison of the link speed of two neighboring antennas is also available. For example, when the computation unit 76 computes that the link speed of the antenna 96d that is smaller than that of the antenna 96c, the control circuit 72 activates additional radiators of antenna 96d to switch the antenna 96d into an emitting mode having stronger directivity and deactivates a number of antenna 96c to switch the antenna 96c into an emitting mode having weaker directivity.

If the radio signal strength index is taken as the policy of QoS, and when the computation unit 76 computes that the radio signal strength index of WLAN unit is larger than the first parameter, then the control circuit 72 reduces the number of active radiators of the WLAN unit 66 to form a radiation pattern with weaker directivity to share loads of neighboring antennas. When the radio signal strength index is smaller than the first parameter, the control circuit 72 turns on more radiators of the WLAN units to form a radiation pattern with stronger directivity. In fact, as mentioned above, comparing the radio signal strength indexes of two neighboring antennas is also available. For example, when the computation unit 76 computes that the radio signal strength index of the antenna 96d is smaller than that of the antenna 96c, the control circuit 72 turns on additional radiators of antenna 96d to switch the antenna 96d into an emitting mode having stronger directivity and reduces the number of active radiators of antenna 96c to switch the antenna 96c into an emitting mode having weaker directivity.

If the data flow on network is taken as the policy of QoS, and when the computation unit 76 computes that the radio signal strength index of WLAN unit is larger than the first parameter, then the control circuit 72 reduces the number of active radiators of the WLAN unit 66 to form a radiation pattern with weaker directivity to share loads of neighboring antennas. When the data flow on network is smaller than the first parameter, the control circuit 72 turns on more radiators of the WLAN units to form a radiation pattern with stronger directivity. In fact, as mentioned above, comparing the data flows on network of two neighboring antennas is also available. For example, when the computation unit 76 computes that the data flow on network of the antenna 96d is less than that of the antenna 96c, the control circuit 72 turns on more radiators of antenna 96d to switch the antenna 96d into an emitting mode having stronger directivity and turns off a number of active radiators of antenna 96c to switch the antenna 96c into an emitting mode having weaker directivity.

If the channel utilization is taken as the policy of QoS, and when the computation unit 76 computes that the radio signal strength index of WLAN unit is greater than the first parameter, the control circuit 72 reduces the number of active radiators of the WLAN unit 66 to form a radiation pattern with weaker directivity, thus sharing the loads of neighboring antennas. When the channel utilization is smaller than the first parameter, the control circuit 72 turns on more radiators of the WLAN units to form a radiation pattern with stronger directivity. In fact, as mentioned above, comparing the channel utilizations of two neighboring antennas is available. For example, when the computation unit 76 computes that the channel utilization of the antenna 96d is smaller than that of the antenna 96c, the control circuit 72 turns on more radiators of antenna 96d to switch the antenna 96d into an emitting mode having stronger directivity and reduces the number of active radiators of antenna 96c to switch the antenna 96c into an emitting mode having weaker directivity.

Figure 19:
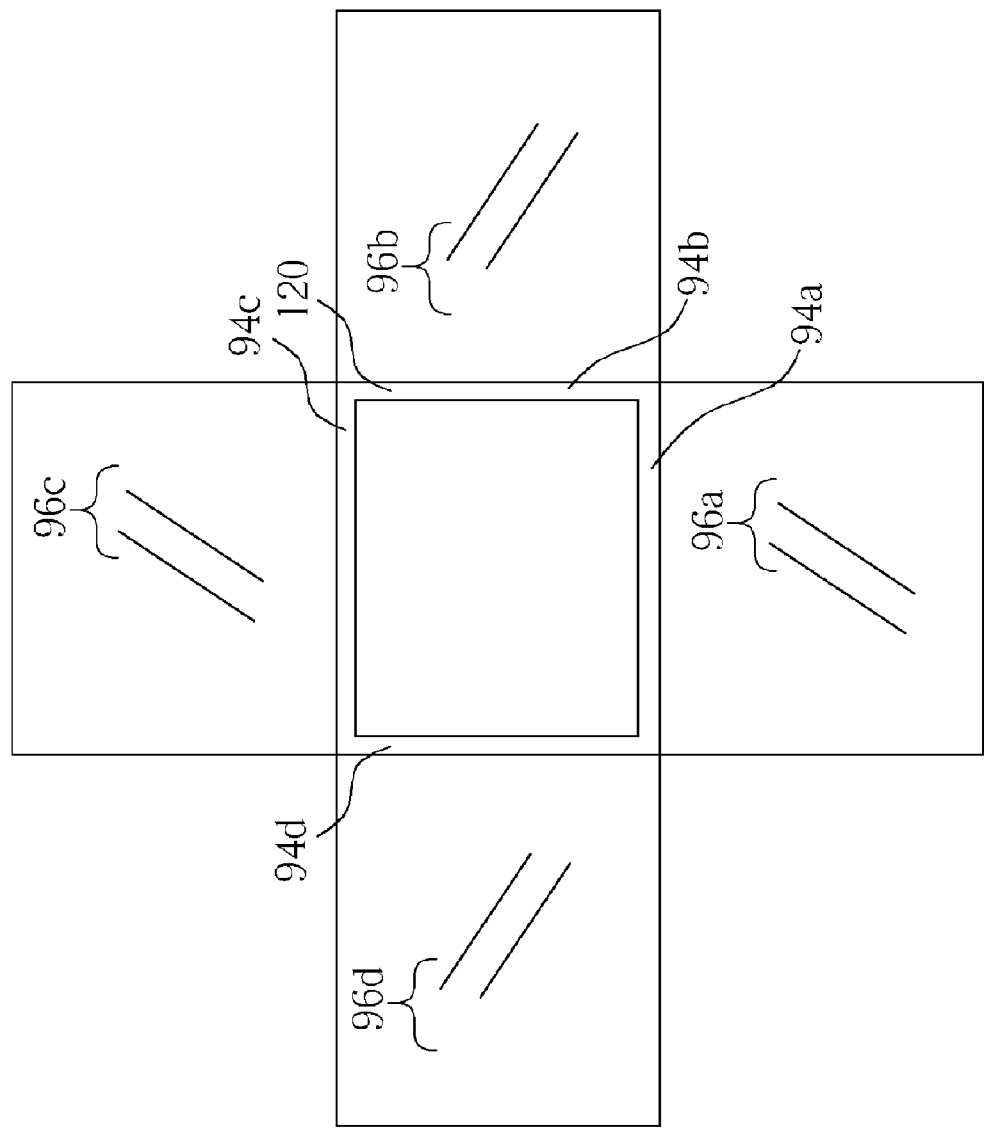
FIG. 19 is a diagram of the antenna of each WLAN unit installed on the housing of the third embodiment according to the present invention.
Figure 20:
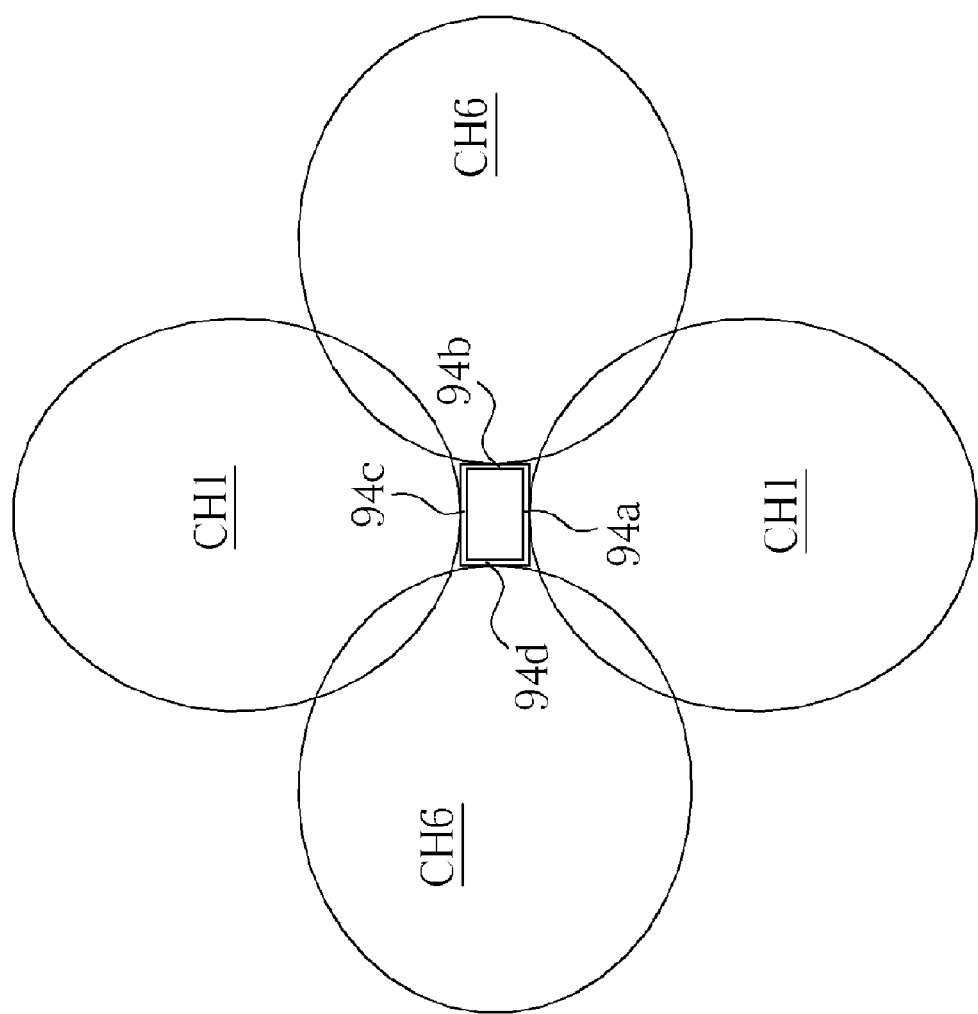
FIG. 20 is a diagram of each antenna that shares a channel of the third embodiment according to the present invention.

Furthermore, the wireless communication module 64 is not limited to only comprising 6 WLAN units 66, other number of WLAN units are also available. Please refer to FIG. 19, which is a diagram of antenna 96 of each WLAN unit 66 installed on the housing 120 of the third embodiment according to the present invention. Please note that in the first embodiment, the housing 68 is a hexagon, but in the third embodiment, the housing 120 is a quadrilateral. Therefore, the wireless communication device 60 in the third embodiment comprises four WLAN units 66a, 66c, 66c, 66d (not shown in FIG. 19), and the housing 120 comprises four shielding surfaces 94a, 94b, 94c, 94d composed of metals for shielding radio signals. The corresponding four antennas 96a, 96b, 96c, 96d of the four WLAN units 66a, 66b, 66c, 66d (not shown in FIG. 19) are positioned on the four shielding surface 94a, 94b, 94c, 94d. The antennas 96a, 96b, 96c, 96d are arranged that adjacent antennas are orthogonal. This means that the antenna 96a on the shielding surface 94a is orthogonal to the antenna 96b on the shielding surface 94b, the antenna 96b on the shielding surface 94b is orthogonal to the antenna 96c on the shielding surface 94c, the antenna 96c on the shielding surface 94c is orthogonal to the antenna 96d on the shielding surface 94d, and the antenna 96d on the shielding surface 94d is orthogonal to the antenna 96a on the shielding surface 94a. According to the arrangement, it makes the direction of radio signals of radiators on adjacent shielding surfaces orthogonal. Therefore, the isolation of radio signals of radiators on adjacent shielding surfaces is increased, even when two adjacent radiators utilize the same or neighboring channels (such as utilizing CH1 or utilizing CH1 and CH6), the interference is reduced. Please refer to FIG. 20, which is a diagram of each antenna that shares a channel of the third embodiment according to the present invention. As shown in FIG. 20, radio signals transmitted from antennas on two parallel shielding surface are on the same channel, radio signals transmitted from antennas on two adjacent shielding surface are on different channels. This means that antennas 96a, 96c utilize channel CH1, and antennas 96b, and 96d utilize channel CH11. The advantage of this arrangement is to avoid interference between two adjacent radiators. Because four radiators are utilized for WLAN data transmission, they can ideally achieve four times the bandwidth of one AP as described in the prior art. In another word, if the maximum bandwidth of one AP is is 11 Mbps, then the maximum bandwidth of the wireless communication device 60 the third embodiment of the present invention is 11*4=44 Mbps.

Figure 21:
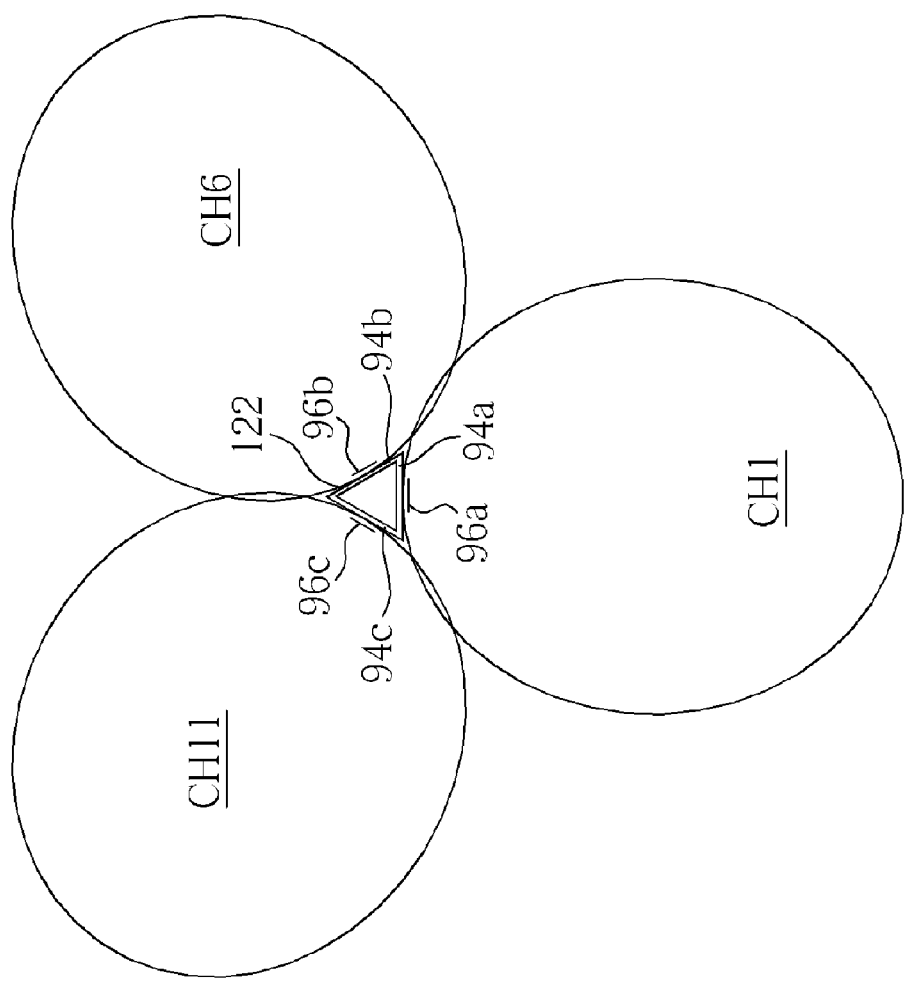
FIG. 21 is a diagram of the antenna of each WLAN unit installed on the housing of the fourth embodiment according to the present invention.

Similarly, the wireless communication module 64 can comprises three WLAN units 66. Please refer to FIG. 21, which is a diagram of antenna 96 of each WLAN unit 66 installed on the housing 122 of the fourth embodiment according to the present invention. The housing 122 is a triangle and comprises of three shielding surfaces 94a, 94b, and 94c on the three surface of the triangle. The three shielding surfaces 94a, 94b, and 94c are composed of metals for shielding radio signals. Three antennas 96a, 96b, and 96c are on the three respective shielding surfaces 94a, 94b, and 94c. Additionally, in the channel utilization arrangement, the antenna 96a can be arranged to utilize channel CH1, the antenna 96b can be arranged to utilize channel CH6, the antenna 96c can be arranged to utilize channel CH11 so that the effect of overlapping main lobes are efficiently reduced.

Therefore, the wireless communication device 60 can achieve three times bandwidth to that of the bandwidth when only one AP is utilized.

Please refer to FIG. 5 again. At last, the wireless communication 60 can bridge the data wirelessly transmitted in the wireless communication module to LAN through LAN communication module 82, and the processing module 74 outputs the data transmission result into the log for providing the related information of operation of the wireless communication device 60 to users. For example, it can provide the information when the antenna control unit 70 switches the antenna 96 of the WLAN unit 66, or the information of which WLAN 66 the user is utilizing. Furthermore, when the wireless communication device 60 provides WLAN data transmission service to users, the state displaying module 86 can simultaneously display the state of wireless communication device 60 when connecting to LAN, such as the connection state or operation state of each WLAN unit 66 or of LAN communication module 82.

In contrast to the prior art, the present invention can provide a wireless communication device according to data transmission information on network to switch the antennas so that it can provide different radiation patterns in different demands. For example, when the load of user service area of a wireless communication device is larger, the WLAN unit can turn on more number of radiators to provide a radiation pattern with stronger directivity. Therefore, the coverage area of the wireless communication device can cover the service area. In the contrast, when the load of user service area of the wireless communication device is lower, the wireless communication can help neighboring wireless communication device share the greater load. This is again accomplished, when the WLAN turns off a number of active radiators to provide a pattern with wider coverage area instead of stronger directivity. Therefore, the coverage area of the wireless communication device can help cover the service areas of neighboring wireless communication devices to share the greater load. Additionally, different parameters are determined for judging loads of data transmission. Therefore, the wireless communication of the present invention can combine a plurality of the prior AP to provide larger wireless transmission bandwidth and can change according to different policy of QoS, such as the changes of antenna coverage area or directivity. This makes the arrangement of antennas more flexible and robust.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A wireless communication device comprising:
   a housing comprising a first shielding surface and a second shielding surface;
   a wireless communication module installed inside the housing, the wireless communication module comprising:
      a first antenna installed on the first shielding surface of the housing, the first antenna is capable of emitting a first electromagnetic signal with a first frequency, and the first antenna is capable of switching between a first emitting mode and a second emitting mode wherein a coverage angle of the first emitting mode is wider than a coverage angle of the second emitting mode;
      a second antenna installed on the second shielding surface of the housing, the second antenna is capable of emitting a second electromagnetic signal with a second frequency, and the second antenna is capable of switching between a third emitting mode and a fourth emitting mode wherein a coverage angle of the third emitting mode is wider than a coverage angle of the fourth emitting mode; and
      an antenna control unit electrically connected to the first antenna and the second antenna for switching the first antenna between the first emitting mode and the second emitting mode and switching the second antenna between the third emitting mode and the fourth emitting mode; and
   a processing module installed inside the housing comprising:
      a computation unit for computing data transmission information of the first antenna and the second antenna; and
      a control unit for controlling the antenna control unit according to the data transmission information computed by the computation unit.

2. The wireless communication device of claim 1, wherein the antenna control unit further comprises a control circuit electrically connected to the first antenna and the second antenna is capable of selectively switching on a number of radiators of the first antenna and the second antenna, a first emitting mode of a radiation pattern with a weaker directivity is formed when the control circuit reduces a number of active radiators of the first antenna, a second emitting mode of a radiation pattern with a stronger directivity is formed when the control circuit switches on a number of inactive radiators of the first antenna, a third emitting mode of a radiation pattern with a weaker directivity being formed when the control circuit reduces a number of active radiators of the second antenna, and a fourth emitting mode of a radiation pattern with a stronger directivity being formed when the control circuit switches on a number of inactive radiators of the second antenna.

3. The wireless communication device of claim 2, wherein the first shielding surface of the housing is adjacent to the second shielding surface of the housing, and the two shielding surfaces form in an angle.

4. The wireless communication device of claim 3, wherein the computation unit is capable of computing a MAC number of the first antenna and a MAC number of the second antenna, and the control unit reduces a number of the active radiators of the first antenna for switching the first antenna into the first emitting mode and switches on a number of the inactive radiators of the second antenna for switching the second antenna into the fourth emitting mode when the MAC number of the first antenna is less than the MAC number of the second antenna.

5. The wireless communication device of claim 3, wherein the computation unit is capable of computing a MAC number of the first antenna and a MAC number of the second antenna, and the control unit switches on a number of the inactive radiators of the first antenna for switching the first antenna into the second emitting mode and reduces a number of the active radiators of the second antenna for switching the second antenna into the third emitting mode when the MAC number of the first antenna is more than the MAC number of the second antenna.

6. The wireless communication device of claim 3, wherein the computation unit is capable of computing a link speed of the first antenna and a link speed of the second antenna, and the control unit switches on a number of the inactive radiators of the first antenna for switching the first antenna into the second emitting mode and reduces a number of the active radiators of the second antenna for switching the second antenna into the third emitting mode when the link speed of the first antenna is lower than the link speed of the second antenna.

7. The wireless communication device of claim 3, wherein the computation unit is capable of computing a link speed of the first antenna and a link speed of the second antenna, and the control unit reduces a number of the active radiators of the first antenna for switching the first antenna into the first emitting mode and switches on a number of the inactive radiators of the second antenna for switching the second antenna into the fourth emitting mode when the link speed of the first antenna is greater than the link speed of the second antenna.

8. The wireless communication device of claim 3, wherein the computation unit is capable of computing a radio signal strength index of the first antenna and a radio signal strength index of the second antenna, and the control unit switches on a number of the inactive radiators of the first antenna for switching the first antenna into the second emitting mode and reduces a number of the active radiators of the second antenna for switching the second antenna into the third emitting mode when the radio signal strength index of the first antenna is lower than the radio signal strength index of the second antenna.

9. The wireless communication device of claim 3, wherein the computation unit is capable of computing a radio signal strength index of the first antenna and a radio signal strength index of the second antenna, and the control unit reduces a number of the active radiators of the first antenna for switching the first antenna into the first emitting mode and switches on a number of the inactive radiators of the second antenna for switching the second antenna into the fourth emitting mode when the radio signal strength index of the first antenna is greater than the radio signal strength index of the second antenna.

10. The wireless communication device of claim 3, wherein the computation unit is capable of computing a data flow of the first antenna and a data flow of the second antenna, and the control unit switches on a number of the inactive radiators of the first antenna for switching the first antenna into the second emitting mode and reduces a number of the active radiators of the second antenna for switching the second antenna into the third emitting mode when the data flow of the first antenna is lower than the data flow of the second antenna.

11. The wireless communication device of claim 3, wherein the computation unit is capable of computing a data flow of the first antenna and a data flow of the second antenna, and the control unit reduces a number of the active radiators of the first antenna for switching the first antenna into the first emitting mode and switches on a number of the inactive radiators of the second antenna for switching the second antenna into the fourth emitting mode when the data flow of the first antenna is greater than the data flow of the second antenna.

12. The wireless communication device of claim 3, wherein the computation unit is capable of computing a channel utilization of the first antenna and a channel utilization of the second antenna, and the control unit reduces a number of the active radiators of the first antenna for switching the first antenna into the first emitting mode and switches on a number of the inactive radiators of the second antenna for switching the second antenna into the fourth emitting mode when the channel utilization of the first antenna is lower than the channel utilization of the second antenna.

13. The wireless communication device of claim 3, wherein the computation unit is capable of computing a channel utilization of the first antenna and a channel utilization of the second antenna, and the control unit switches on a number of the inactive radiators of the first antenna for switching the first antenna into the second emitting mode and reduces a number of the active radiators of the second antenna for switching the second antenna into the third emitting mode when the channel utilization of the first antenna is greater than the channel utilization of the second antenna.

14. The wireless communication device of claim 1, further comprising a local area network (LAN) communication module for connecting the wireless communication device to the LAN.

15. The wireless communication device of claim 1, further comprising a power module for providing power to the wireless communication device.

16. The wireless communication device of claim 1, further comprising a state displaying module for displaying a state of the wireless communication device when connected to the LAN.

17. The wireless communication device of claim 1, further comprising a system resetting module for resetting related functions of the wireless communication device.

18. The wireless communication device of claim 1, wherein the first emitting mode of the first antenna is the same as the third emitting mode of the second antenna.

19. The wireless communication device of claim 1, wherein the second emitting mode of the first antenna is the same as the fourth emitting mode of the second antenna.

20. The wireless communication device of claim 1, wherein the first antenna comprises a first radiator and a second radiator installed in the first shielding surface of the housing.

21. The wireless communication device of claim 1, wherein the second antenna comprises a third radiator and a fourth radiator installed in the second shielding surface of the housing.

22. The wireless communication device of claim 21, wherein a first electromagnetic signal emitted by the first radiator and the second radiator, and a second electromagnetic signal by the third radiator and the fourth radiator are orthogonal.

23. The wireless communication device of claim 22, wherein the first electromagnetic signal and the second electromagnetic signal belong to the same channel.

24. The wireless communication device of claim 20, wherein the first radiator and the second radiator are arranged in parallel.

25. The wireless communication device of claim 24, wherein an angle between a projection of the axle of the housing on the first shielding surface and the direction of the first radiation is 45 degrees, and an angle between a projection of the axel of the housing on the first shielding surface and the direction of the first radiation is 45 degrees.

26. The wireless communication device of claim 20, wherein the third radiator and the fourth radiator are arranged in parallel.

27. The wireless communication device of claim 26, wherein an angle between a projection of the axle of the housing on the second shielding surface and the direction of the third radiation is 45 degrees, and an angle between a projection of the axel of the housing on the second shielding surface and the direction of the fourth radiation is 45 degrees.

28. The wireless communication device of claim 26, wherein the first radiator and the third radiator are orthogonal.

* * * * *